US012107371B2

(12) United States Patent
Kim

(10) Patent No.: US 12,107,371 B2
(45) Date of Patent: Oct. 1, 2024

(54) BOARD CONNECTOR

(71) Applicant: LS MTRON LTD., Anyang-si (KR)

(72) Inventor: Dong Wan Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 275 days.

(21) Appl. No.: 17/619,925

(22) PCT Filed: Jun. 17, 2020

(86) PCT No.: PCT/KR2020/007825
§ 371 (c)(1),
(2) Date: Dec. 16, 2021

(87) PCT Pub. No.: WO2020/256396
PCT Pub. Date: Dec. 24, 2020

(65) Prior Publication Data

US 2022/0360023 A1 Nov. 10, 2022

(30) Foreign Application Priority Data

Jun. 20, 2019 (KR) ........................ 10-2019-0073582
Jun. 16, 2020 (KR) ........................ 10-2020-0073036

(51) Int. Cl.
*H01R 13/6587* (2011.01)

(52) U.S. Cl.
CPC ................................ *H01R 13/6587* (2013.01)

(58) Field of Classification Search
CPC .............. H01R 13/658; H01R 13/6581; H01R 13/6582; H01R 13/6583; H01R 13/6585; H01R 13/6586; H01R 13/6587
USPC .................................................... 439/607.07
See application file for complete search history.

(56) References Cited

U.S. PATENT DOCUMENTS

2017/0093063 A1 3/2017 Lee
2017/0352696 A1 12/2017 Swernofsky et al.
2022/0360023 A1* 11/2022 Kim ...................... H01R 12/73
2023/0056967 A1* 2/2023 Kim .................... H01R 12/716

FOREIGN PATENT DOCUMENTS

JP 2006085944 A 3/2006
JP 2017208165 A 11/2017
JP 2018022631 A 2/2018
KR 20160082442 A 7/2016
KR 20160089216 A 7/2016
(Continued)

OTHER PUBLICATIONS

International Search Report for related International Application No. PCT/KR2020/007825; report dated Dec. 24, 2020; (5 pages).
(Continued)

*Primary Examiner* — Khiem M Nguyen
(74) *Attorney, Agent, or Firm* — K&L Gates LLP

(57) ABSTRACT

The present disclosure relates to a board connector including a receptacle insulating part, a receptacle transmission contact coupled to the receptacle insulating part and configured to allow electrical connection to a plug connector, and a receptacle radio frequency (RF) contact coupled to the receptacle insulating part so as to be disposed at a position spaced apart from the receptacle transmission contact and configured to allow transmission of a RF signal.

12 Claims, 15 Drawing Sheets

1A

(56) References Cited

FOREIGN PATENT DOCUMENTS

| | | | |
|---|---|---|---|
| KR | 20180111144 | A | 10/2018 |
| WO | 2018049686 | A1 | 3/2018 |

OTHER PUBLICATIONS

Written Opinion for related International Application No. PCT/KR2020/007825; report dated Dec. 24, 2020; (5 pages).

Japanese Office Action for related Japanese Application No. 2021-565801; action dated Nov. 11, 2022; (7 pages).

* cited by examiner

1

I - I

II - II

BOARD CONNECTOR

CROSS-REFERENCE TO RELATED APPLICATIONS

This application is the National Stage filing under 35 U.S.C. 371 of International Application No. PCT/KR2020/007825, filed on Jun. 17, 2020, which claims the benefit of earlier filing date and right of priority to Korean Application No. 10-2019-0073582, filed on Jun. 20, 2019 and Korean Application No. 10-2020-0073036, filed Jun. 16, 2020, the contents of which are all hereby incorporated by reference herein in their entirety.

FIELD

The present disclosure relates to a board connector installed in an electronic device for electrical connection between boards.

BACKGROUND

Connectors are provided in various electronic devices for electrical connection. For example, a connector may be installed in an electronic device such as a mobile phone, a computer, and a tablet computer and electrically connect various parts installed in the electronic device to each other.

Generally, among the electronic devices, wireless communication devices such as a smartphone and a tablet personal computer (PC) have a radio frequency (RF) connector and a board-to-board connector (hereinafter referred to as “board connector”) disposed therein. The RF connector transmits a RF signal. The board connector processes a digital signal of a camera or the like.

The RF connector and board connector are mounted on a printed circuit board (PCB). Conventionally, since multiple board connectors and RF connectors are mounted together with a plurality of parts in a limited PCB space, there is a problem in that a PCB mounting area increases. Therefore, with the trend of size reduction of smartphones, technology for integrating the RF connector and board connector and decreasing and optimizing the PCB mounting area is necessary.

FIG. 1 is a schematic perspective view of a board connector according to a related art.

Referring to FIG. 1, a board connector 100 according to the related art includes a first connector 110 and a second connector 120.

The first connector 110 is for coupling to a first board (not illustrated). The first connector 110 may be electrically connected to the second connector 120 through a plurality of first contacts 111.

The second connector 120 is for coupling to a second board (not illustrated). The second connector 120 may be electrically connected to the first connector 110 through a plurality of second contacts 121.

The board connector 100 according to the related art may electrically connect the first board and the second board to each other as the first contacts 111 and the second contacts 121 are connected to each other. Also, in a case in which some of the first contacts 111 and the second contacts 121 are used as RF contacts for RF signal transmission, the board connector 100 according to the related art may be implemented so that a RF signal is transmitted between the first board and the second board through the RF contacts.

Here, the board connector 1 according to the related art has the following problems.

First, the board connector 1 according to the related art has a problem in that, in a case in which the contacts spaced apart by a relatively short distance among the contacts 111 and 121 are used as the RF contacts, signal transmission is not smoothly performed due to RF signal interference between the RF contacts 111', 111", 121', and 121".

Second, the board connector 1 according to the related art has a problem in that, although a RF signal shielding part 112 is present at an outermost portion of the connector and thus it is possible to shield radiation of a RF signal to the outside, shielding between RF signals is not performed.

Third, in the board connector 1 according to the related art, the RF contacts 111', 111", 121', and 121" respectively include mounting portions **111*a*', 111*a*", 121*a*', and 121*a*" that are mounted on the boards, and the mounting portions 111*a*', 111*a*", 121*a*', and 121*a*" are disposed to be exposed to the outside. Accordingly, the board connector 1 according to the related art has a problem in that shielding is not performed for the mounting portions 111*a*', 111*a*", 121*a*', and 121*a*"**.

SUMMARY

The present disclosure is directed to providing a board connector capable of reducing the possibility of an occurrence of RF signal interference between RF contacts.

The present disclosure is also directed to providing a board connector capable of improving space utilization for the use of contacts.

To achieve the above objectives, the present disclosure may include the following configurations.

A board connector according to the present disclosure may include a receptacle insulating part, a receptacle transmission contact coupled to the receptacle insulating part and configured to allow electrical connection to a plug connector, a receptacle RF contact coupled to the receptacle insulating part so as to be disposed at a position spaced apart from the receptacle transmission contact and configured to allow transmission of a RF signal, and a receptacle grounding part coupled to the receptacle insulating part so as to be spaced apart from the receptacle RF contact. The receptacle insulating part may include a transmission protrusion configured to support the receptacle transmission contact. The receptacle RF contact may include a first receptacle RF contact and a second receptacle RF contact coupled to the receptacle insulating part so as to be disposed to be spaced apart from each other while the transmission protrusion and the receptacle transmission contact are disposed therebetween. The receptacle grounding part may include a first receptacle grounding member coupled to a first sidewall of the receptacle insulating part at a position spaced apart from the first receptacle RF contact.

In the board connector according to the present disclosure, the first receptacle grounding member may include a first receptacle grounding inner member disposed to cover a first sidewall inner surface of the first sidewall between the first receptacle RF contact and the first sidewall, a first receptacle grounding outer member disposed to cover a first sidewall outer surface which is in a direction opposite to the first sidewall inner surface, and a first receptacle grounding connection member configured to connect the first receptacle grounding inner member and the first receptacle grounding outer member. The first receptacle RF contact may be double-shielded through the first receptacle grounding inner member and the first receptacle grounding outer member.

A board connector according to the present disclosure may include a plug insulating part, a plug transmission contact coupled to the plug insulating part and configured to allow electrical connection to a receptacle connector, a plug RF contact coupled to the plug insulating part so as to be disposed at a position spaced apart from the plug transmission contact and configured to allow transmission of a RF signal, and a plug grounding part coupled to the plug insulating part so as to be spaced apart from the plug RF contact. The plug RF contact may include a first plug RF contact and a second plug RF contact coupled to the plug insulating part so as to be disposed to be spaced apart from each other while a transmission accommodation groove, which is formed in the plug insulating part, and the plug transmission contact are disposed therebetween. The plug grounding part may include a first plug grounding member formed to cover at least two sides of the first plug RF contact at a position spaced apart from the plug RF contact.

According to the present disclosure, the following effects can be achieved.

Since a board connector according to the present disclosure is implemented to reduce the possibility of an occurrence of RF signal interference between RF contacts, the overall performance of the connector can be improved.

By securing a space in which a transmission contact may be disposed, the board connector according to the present disclosure can improve space utilization for the use of contacts.

According to the present disclosure, by integrating a board connector and a RF connector into one body, it is possible to decrease and optimize a PCB mounting area as compared to a conventional area resulting from separately mounting a board connector and a RF connector on a PCB. Therefore, according to the present disclosure, since the integration of the parts enables implementation through a single process, it is possible to increase the manufacturing process efficiency and relatively lower a defect rate.

According to the present disclosure, by forming an isolating structure to prevent a RF signal from interfering with a signal from a nearby board, the RF signal transmission performance can be improved.

DETAILED DESCRIPTION

Figure 1:
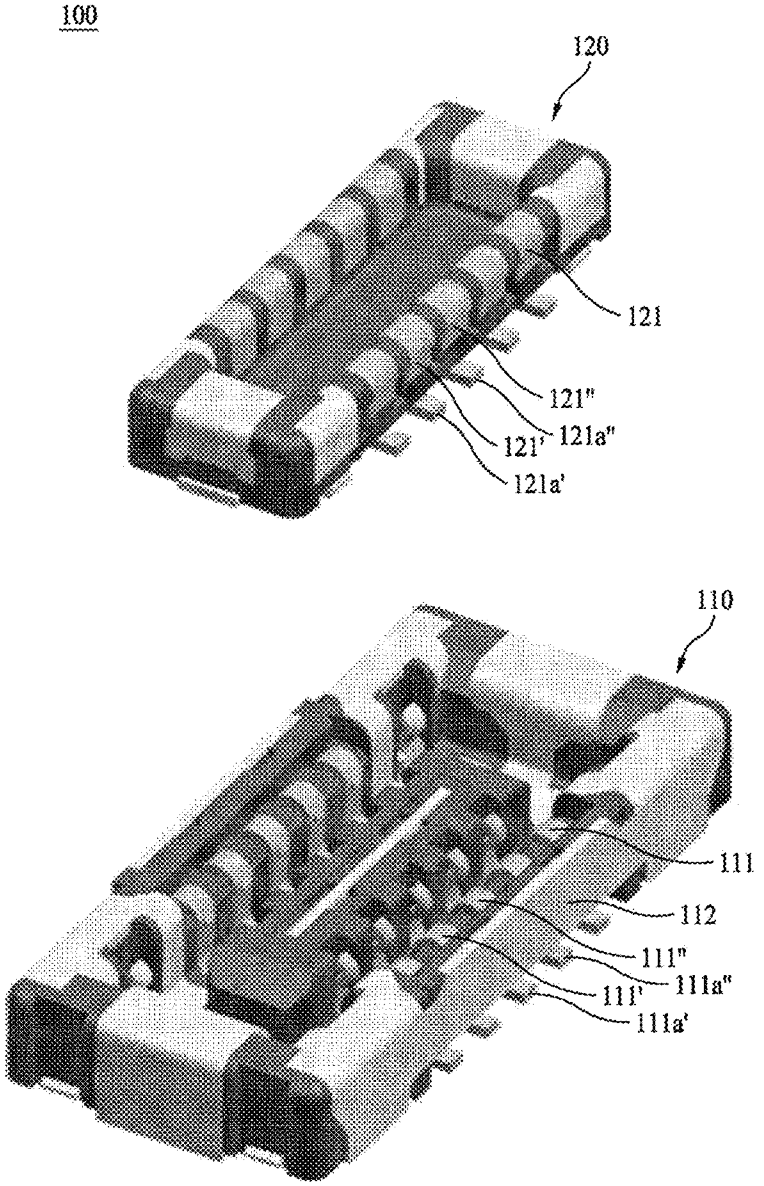
FIG. 1 (PRIOR ART)
FIG. 1 is a schematic perspective view of a board connector according to the related art.
Figure 2:
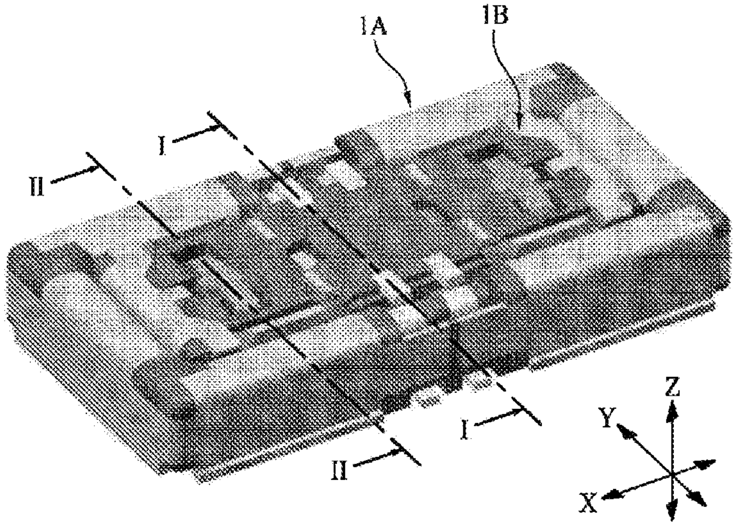
FIG. 2 is a schematic perspective view illustrating a state in which a receptacle connector and a plug connector are coupled to each other in a board connector according to the present disclosure.
Figure 3:
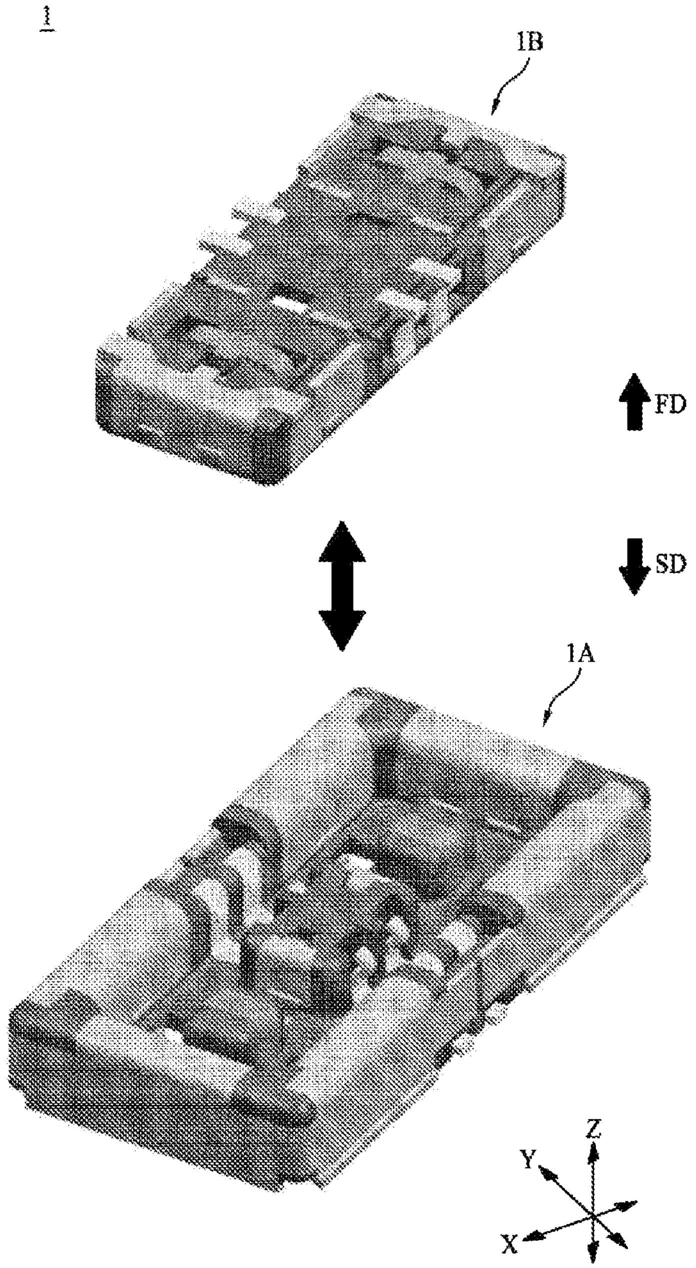
FIG. 3 is a schematic perspective view illustrating a state before the receptacle connector and the plug connector are coupled to each other in the board connector according to the present disclosure.

Hereinafter, an embodiment of a board connector according to the present disclosure will be described in detail with reference to the accompanying drawings.

Referring to FIGS. 2 to 7, a board connector 1 according to the present disclosure is installed in an electronic device (not illustrated) such as a mobile phone, a computer, and a tablet computer. The board connector 1 according to the present disclosure serves to electrically connect a first board 10A (see FIGS. 6 and 7) and a second board 10B (see FIGS. 6 and 7) in the electronic device. Each of the first board 10A and the second board 10B may be a printed circuit board (PCB).

Referring to FIGS. 2 to 5, the board connector 1 according to an embodiment of the present disclosure may include at least one of a receptacle connector 1A and a plug connector 1B.

The receptacle connector 1A may be coupled to the first board 10A. The receptacle connector 1A may include a receptacle insulating part 2, a receptacle transmission contact 3 coupled to the receptacle insulating part 2 and configured to allow transmission of signals such as data, a receptacle RF contact 4 coupled to the receptacle insulating part 2 at a position spaced apart from the receptacle transmission contact 3 and configured to allow transmission of a RF signal, and a receptacle grounding part 5 coupled to the receptacle insulating part 2 and configured to allow grounding.

The plug connector 1B may be coupled to the second board 10B. The plug connector 1B may include a plug insulating part 6, a plug transmission contact 7 configured to allow electrical connection to the receptacle connector 1A, a plug RF contact 8 coupled to the plug insulating part 6 so as to be disposed at a position spaced apart from the plug transmission contact 7 and configured to allow transmission of a RF signal, and a plug grounding part 9 coupled to the plug insulating part 6 so as to be spaced apart from the plug RF contact 8.

As the plug connector 1B is coupled to the receptacle connector 1A, the first board 10A and the second board 10B may be electrically connected to each other. For example, the board connector 1 according to the present disclosure is implemented so that signals such as data are transmitted between the first board 10A and the second board 10B as the receptacle transmission contact 3 and the plug transmission contact 7 are connected to each other. Also, the board connector 1 according to the present disclosure is implemented so that a RF signal is transmitted between the first board 10A and the second board 10B as the receptacle RF contact 4 and the plug RF contact 8 are connected to each other.

Referring to FIGS. 2 to 7, in the board connector 1 according to the present disclosure, the receptacle RF contact 4 may include a first receptacle RF contact 41 and a second receptacle RF contact 42. The first receptacle RF contact 41 and the second receptacle RF contact 42 may be coupled to the receptacle insulating part 2. The first receptacle RF contact 41 and the second receptacle RF contact 42 may be disposed to be spaced apart from each other while the receptacle transmission contact 3 is disposed therebetween. Accordingly, the board connector 1 according to the present disclosure may achieve the following effects.

First, the board connector 1 according to the present disclosure may be implemented so that the first receptacle RF contact 41 and the second receptacle RF contact 42 are spaced a predetermined distance from each other with respect to the receptacle transmission contact 3. Accordingly, as compared to the related art in which contacts for RF signal transmission are disposed relatively close to each other, the board connector 1 according to the present disclosure may reduce the possibility of an occurrence of RF signal interference between the RF contacts. Therefore, by securing the stability of RF signal transmission, the board connector 1 according to the present disclosure can improve the overall performance of the connector.

Second, the board connector 1 according to the present disclosure is implemented so that the receptacle transmission contact 3 is disposed in a space between the first receptacle RF contact 41 and the second receptacle RF contact 42. Accordingly, by increasing a separation distance between the first receptacle RF contact 41 and the second receptacle RF contact 42, the board connector 1 according to the present disclosure may improve the stability of RF signal transmission and secure a space in which the receptacle transmission contact 3 may be disposed.

Therefore, the board connector 1 according to the present disclosure may improve space utilization for the use of contacts.

Figure 4:
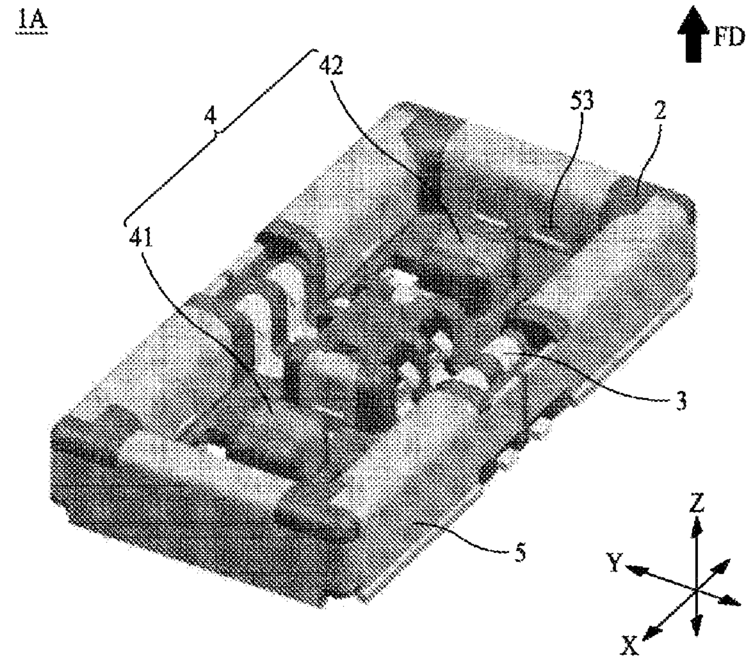
FIG. 4 is a schematic perspective view relating to the receptacle connector in the board connector according to the present disclosure.

Hereinafter, the receptacle insulating part 2, the receptacle transmission contact 3, the receptacle RF contact 4, the receptacle grounding part 5, the plug insulating part 6, the plug transmission contact 7, the plug RF contact 8, and the plug grounding part 9 will be described in detail with reference to the accompanying drawings. Meanwhile, it should be apparent to those of ordinary skill in the art to which the present disclosure pertains that the terms "one side" and "the other side" used herein are for distinguishing different configurations and are not intended to refer to a specific direction. Also, the use and function of the receptacle connector 1A and the plug connector 1B should not be limited by the terms "plug" and "receptacle" used herein. Referring to FIGS. 2 to 10, the receptacle insulating part 2 is for coupling to the first board 10A. The receptacle insulating part 2 may be coupled to the first board 10A through the receptacle grounding part 5. The receptacle insulating part 2 may support the receptacle transmission contact 3 and the receptacle RF contact 4 as the receptacle transmission contact 3 and the receptacle RF contact 4 are coupled to each other. A plurality of receptacle transmission contacts 3 may be coupled to the receptacle insulating part 2. In this case, the receptacle transmission contacts 3 may be disposed to be spaced apart from each other in a first axial direction (X-axis direction). The first axial direction (X-axis direction) may correspond to a direction the same as a longitudinal direction of the receptacle insulating part 2 in which a length thereof is relatively long. In the receptacle insulating part 2, the receptacle transmission contacts 3 may be disposed to be spaced apart from each other in the first axial direction (X-axis direction) while forming a plurality of columns. For example, as illustrated in FIG. 4, in the receptacle insulating part 2, the receptacle transmission contacts 3 may be disposed to be spaced apart from each other in the first axial direction (X-axis direction) while forming two columns. The receptacle insulating part 2 may be formed of a material having an electrical insulating property. The receptacle insulating part 2 may be formed in a rectangular parallelepiped shape as a whole.

The receptacle insulating part 2 may include a first transmission coupling groove (not illustrated). The receptacle transmission contact 3 may be coupled to the receptacle insulating part 2 by being inserted into the first transmission coupling groove. The receptacle insulating part 2 and the receptacle transmission contact 3 may also be coupled to each other through insert molding. The first transmission coupling groove may be formed in a receptacle insulating member 20 of the receptacle insulating part 2. The receptacle insulating member 20 may serve as a main body of the receptacle insulating part 2. In a case in which the board connector 1 according to the present disclosure includes the plurality of receptacle transmission contacts 3, the receptacle insulating part 2 may include a plurality of first transmission coupling grooves. The receptacle insulating part 2 may include as many first transmission coupling grooves as the number of receptacle transmission contacts 3.

The receptacle insulating part 2 may include a first RF coupling groove (not illustrated). The receptacle RF contact 4 may be coupled to the receptacle insulating part 2 by being inserted into the first RF coupling groove. The receptacle insulating part 2 and the receptacle RF contact 4 may also be coupled to each other through insert molding. The first RF coupling groove may be formed in the receptacle insulating member 20. In a case in which the receptacle RF contact 4 includes a plurality of RF contacts, the receptacle insulating part 2 may include a plurality of first RF coupling grooves. The receptacle insulating part 2 may include as many first RF coupling grooves as the number of RF contacts belonging to the receptacle RF contact 4.

Figure 8:
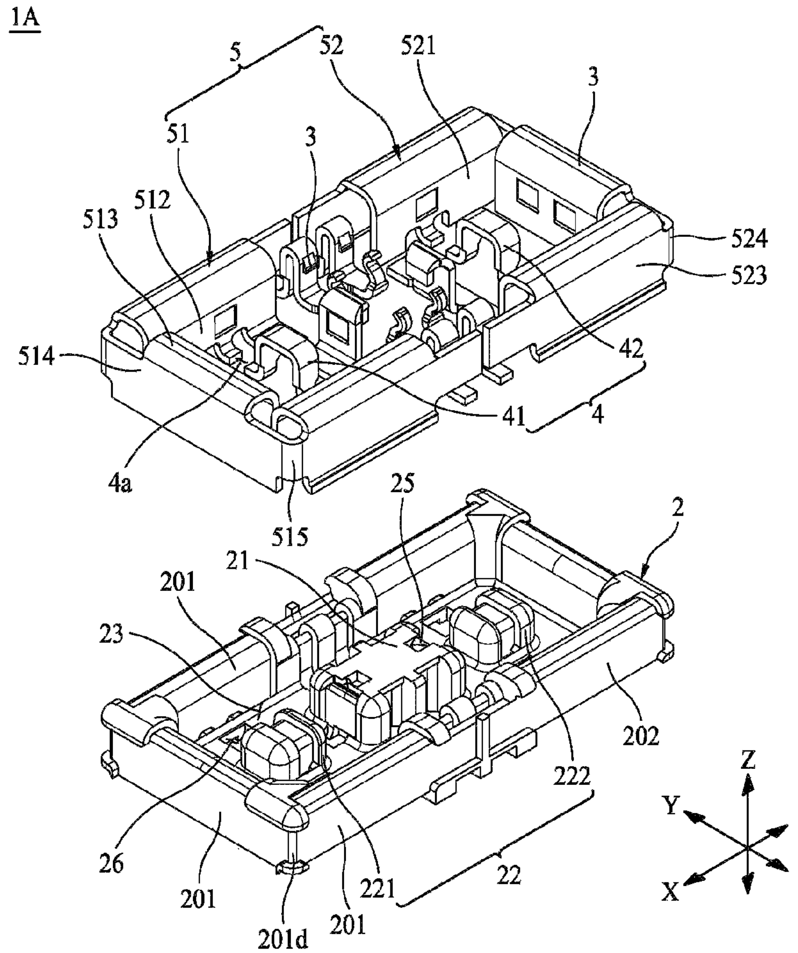
FIG. 8 is a schematic exploded perspective view for illustrating a configuration of the receptacle connector in the board connector according to the present disclosure.

Referring to FIG. 8, the receptacle insulating part 2 may include a transmission protrusion 21 and a RF protrusion 22.

The transmission protrusion 21 supports the receptacle transmission contact 3. The receptacle transmission contact 3 may be coupled to the transmission protrusion 21. The transmission protrusion 21 and the receptacle transmission contact 3 may also be coupled to each other through insert molding. The transmission protrusion 21 may protrude in a first direction (a direction indicated by an arrow FD). The first direction (the direction indicated by the arrow FD) may be a direction the same as a direction in which the overall height of the board connector 1 according to the present disclosure increases and may be a direction from the receptacle insulating part 2 toward the plug insulating part 6. The transmission protrusion 21 may be formed on an intermediate point of the receptacle insulating member 20. The transmission protrusion 21 may be formed in a rectangular parallelepiped shape as a whole. A portion of the first transmission coupling groove may be formed on the transmission protrusion 21.

The RF protrusion 22 supports the receptacle RF contact 4. The receptacle RF contact 4 is coupled to the RF protrusion 22. The RF protrusion 22 and the receptacle RF contact 4 may also be coupled to each other through insert molding. The RF protrusion 22 may protrude in the first direction (the direction indicated by the arrow FD).

The RF protrusion 22 may be formed at a position spaced apart from the transmission protrusion 21. In a case in which the receptacle RF contact 4 includes a plurality of RF contacts, the receptacle insulating part 2 may include a plurality of RF protrusions 22. For example, in a case in which the receptacle RF contact 4 includes the two RF contacts 41 and 42, the RF protrusion 22 may include a first RF protrusion 221 and a second RF protrusion 222. In this case, as illustrated in FIG. 8, the first RF protrusion 221 and the second RF protrusion 222 may be disposed to be spaced apart from each other in the first axial direction (X-axis direction) while the transmission protrusion 21 is disposed at the center therebetween. The first RF protrusion 221 may support the first receptacle RF contact 41, and the second RF protrusion 222 may support the second receptacle RF contact 42. The first RF protrusion 221 and the second RF protrusion 222 may be implemented in forms identical to each other.

Figure 9:
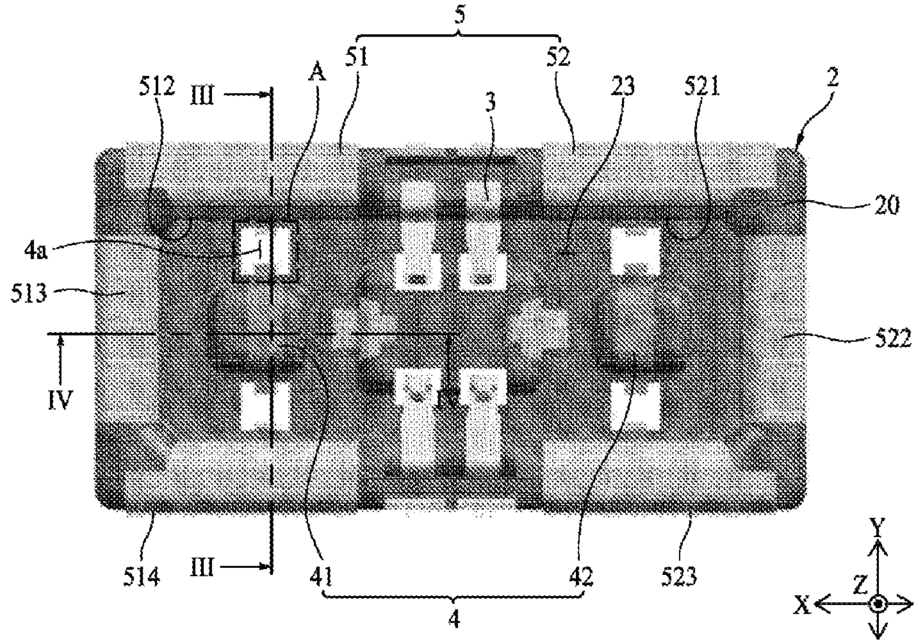
FIG. 9 is a schematic plan view relating to the receptacle connector in the board connector according to the present disclosure.

Referring to FIGS. 8 and 9, the receptacle insulating part 2 may include a seating groove 23.

The seating groove 23 is formed between the receptacle grounding part 5 and the receptacle RF contact 4. The plug grounding part 9 of the plug insulating part 6 is inserted into the seating groove 23. The plug insulating part 6 may be coupled to the receptacle insulating part 2 as the plug grounding part 9 is inserted into the seating groove 23. The seating groove 23 may be formed so that the receptacle grounding part 5 is disposed at an outer side and the transmission protrusion 21 and the RF protrusion 22 are disposed at an inner side. The seating groove 23 may be formed to be disposed between the first transmission coupling grooves disposed while forming a plurality of columns.

Figure 10:
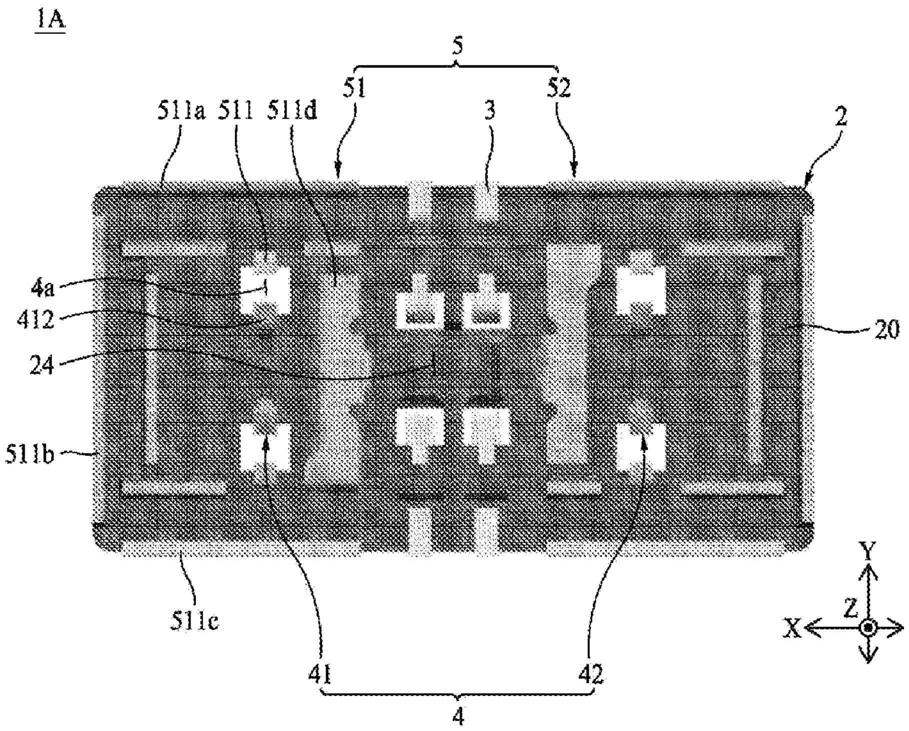
FIG. 10 is a schematic bottom view relating to the receptacle connector in the board connector according to the present disclosure.

Referring to FIG. 10, a receptacle injection groove 24 may be formed in the receptacle insulating part 2.

The receptacle injection groove 24 may be a portion into which an injection resin for forming the receptacle insulating part 2 is added. The receptacle injection groove 24 may be formed at an intermediate point of the receptacle insulating member 20. The receptacle injection groove 24 may be formed to be recessed to a predetermined depth from a lower surface of the receptacle insulating member 20. The receptacle injection groove 24 may be spaced apart from the first board 10A. The receptacle injection groove 24 may be formed in a rectangular parallelepiped shape as a whole. The receptacle injection groove 24 may be formed at a point that is equidistant from the first receptacle RF contact 41 and the second receptacle RF contact 42.

Referring to FIG. 8, the receptacle insulating part 2 may include a receptacle fixing groove 25.

The receptacle grounding part 5 is inserted into the receptacle fixing groove 25. The receptacle grounding part 5 may be coupled to the receptacle insulating part 2 by being inserted into the receptacle fixing groove 25. Accordingly, by being implemented so that the receptacle grounding part 5 is fixed to the receptacle insulating part 2 even when vibration or shaking occurs, the board connector 1 according to the present disclosure may improve a coupling force between the receptacle grounding part 5 and the receptacle insulating part 2. The receptacle fixing groove 25 may be formed by machining a groove of a predetermined depth from an upper surface of the receptacle insulating part 2.

Referring to FIGS. 2 to 10 and FIGS. 17 and 18, the receptacle transmission contact 3 is mounted on the first board 10A. The receptacle transmission contact 3 may be connected to the plug transmission contact 7. Accordingly, a data signal, a power signal, or the like may be transmitted between the first board 10A and the second board 10B. The receptacle transmission contact 3 may be formed of a material having conductivity.

The receptacle transmission contact 3 is coupled to the receptacle insulating part 2. The receptacle transmission contact 3 may be coupled to the transmission protrusion 21. A plurality of receptacle transmission contacts 3 may be coupled to the receptacle insulating part 2. The receptacle transmission contacts 3 may be coupled to the receptacle insulating part 2 so as to be spaced apart from each other in the first axial direction (X-axis direction) while forming a plurality of columns. FIG. 4 illustrates a case in which four receptacle transmission contacts 3 are coupled to the receptacle insulating part 2 so as to be spaced apart from each other in the first axial direction (X-axis direction) while forming two columns in a second axial direction (Y-axis direction). The second axial direction (Y-axis direction) may correspond to a direction perpendicular to the first axial direction (X-axis direction) and may be a direction the same as a width direction of the receptacle insulating part 2 in which a length thereof is relatively short. The transmission protrusion 21 may be disposed between the plurality of columns formed by the receptacle transmission contacts 3. Since the receptacle transmission contacts 3 are implemented to have the same form and function, hereinafter, detailed description will be given on the basis of a single receptacle transmission contact 3.

Referring to FIGS. 2 to 20, the receptacle RF contact 4 is for RF signal transmission. The receptacle RF contact 4 is disposed at a position spaced apart from the receptacle transmission contact 3. The receptacle RF contact 4 may be mounted on the first board 10A and connected to the plug RF contact 8. Accordingly, a data signal, a power signal, or the like may be transmitted between the first board 10A and the second board 10B.

The receptacle RF contact 4 is coupled to the receptacle insulating part 2. The receptacle RF contact 4 may be coupled to the RF protrusion 22. Hereinafter, description will be given on the basis of the case in which the receptacle RF contact 4 includes the two RF contacts 41 and 42, but it should be apparent to those of ordinary skill in the art to which the present disclosure pertains that an embodiment of the board connector 1 according to the present disclosure in which the receptacle RF contact 4 includes three or more RF contacts may be derived from the description below.

Referring to FIGS. 8 to 10, the receptacle RF contact 4 may include the first receptacle RF contact 41 and the second receptacle RF contact 42.

The first receptacle RF contact 41 may be a RF contact disposed at one side with respect to the receptacle transmission contact 3. In this case, the second receptacle RF contact 42 may be a RF contact disposed at the other side with respect to the receptacle transmission contact 3. For example, as illustrated in FIG. 9, in a case in which the first receptacle RF contact 41 is disposed at the left side with respect to the receptacle transmission contact 3, the second plug RF contact 82 may be disposed at the right side with respect to the receptacle transmission contact 3. The first receptacle RF contact 41 may be coupled to the receptacle insulating part 2. The first receptacle RF contact 41 may be coupled to the first RF protrusion 221. The first receptacle RF contact 41 may be formed of a material having conductivity.

Referring to FIGS. 4 and 8 to 10, the second receptacle RF contact 42 is disposed at a position spaced apart from the first receptacle RF contact 41. The second receptacle RF contact 42 and the first receptacle RF contact 41 may be disposed to be spaced apart from each other while the transmission protrusion 21 and the receptacle transmission contact 3 are disposed therebetween. Accordingly, the board connector 1 according to the present disclosure may further reduce the possibility of an occurrence of RF signal interference between the RF contacts using the transmission protrusion 21 and the receptacle transmission contact 3. Therefore, by further improving the stability of RF signal transmission, the board connector 1 according to the present disclosure may further improve the overall performance of the connector. Also, the board connector 1 according to the present disclosure may further increase the separation distance between the first receptacle RF contact 41 and the second receptacle RF contact 42 using the transmission protrusion 21 and the receptacle transmission contact 3. Therefore, the board connector 1 according to the present disclosure may simultaneously improve the stability of RF signal transmission and secure a space in which the receptacle transmission contact 3 may be disposed. Therefore, the board connector 1 according to the present disclosure may further improve space utilization for the use of contacts.

The second receptacle RF contact 42 may be coupled to the receptacle insulating part 2. The second receptacle RF contact 42 may be coupled to the second RF protrusion 222. The second receptacle RF contact 42 may be formed of a material having conductivity. The second receptacle RF contact 42 may be implemented to be substantially the same as the first receptacle RF contact 41 except for the position at which the second receptacle RF contact 42 is disposed.

Referring to FIGS. 4 and 6 to 12, the receptacle grounding part 5 is for grounding to the plug grounding part 9. The receptacle grounding part 5 may be coupled to the receptacle insulating part 2 so as to be spaced apart from the receptacle RF contact 4.

The receptacle grounding part 5 may be formed to surround a side of the receptacle RF contact 4. Accordingly, through the receptacle grounding part 5, the board connector 1 according to the present disclosure may implement a physical barrier that blocks a RF electromagnetic wave radiated from the receptacle RF contact 4 from flowing to the outside. Therefore, the board connector 1 according to the present disclosure may contribute to an improvement in performance of an adjacent electronic device.

The transmission protrusion 21 and the RF protrusion 22 may be disposed at an inner side of the receptacle grounding part 5. The seating groove 23 may be formed between the receptacle grounding part 5 and the protrusions 21 and 22. The receptacle grounding part 5 may be formed as a wall that extends in the first direction (the direction indicated by the arrow FD) from the lower surface of the receptacle insulating member 20. The receptacle grounding part 5 may be formed of a metal material.

Referring to FIGS. 8 to 10, the receptacle grounding part 5 may include a first receptacle grounding member 51.

The first receptacle grounding member 51 may be disposed to cover at least two sides of the first receptacle RF contact 41 at a position spaced apart from the first receptacle RF contact 41. Accordingly, through the first receptacle grounding member 51, the board connector 1 according to the present disclosure may implement a shielding force that blocks a RF electromagnetic wave radiated from the first receptacle RF contact 41 from flowing to the outside. In this case, the first receptacle grounding member 51 may also be implemented as a polygonal structure including three or more surfaces.

The first receptacle grounding member 51 may also be formed to cover all sides of the first receptacle RF contact 41 at a position spaced apart from the first receptacle RF contact 41. In this case, the first receptacle RF contact 41 may be disposed at an inner side of the first receptacle grounding member 51. Accordingly, the board connector 1 according to the present disclosure may further strengthen the shielding force using the first receptacle grounding member 51. The first receptacle grounding member 51 may be formed to cover four sides of the first receptacle RF contact 41 at a position spaced apart from the first receptacle RF contact 41.

Referring to FIGS. 8 to 12, a receptacle cutting hole 4*a* may be formed between the first receptacle grounding member 51 and the first receptacle RF contact 41. The first receptacle grounding member 51 and the first receptacle RF contact 41 may be spaced apart from each other with respect to the receptacle cutting hole 4*a*. In a case in which the first receptacle grounding member 51 and the first receptacle RF contact 41 are integrally formed using a single plate material, the receptacle cutting hole 4*a* may be formed by performing press machining one time. Accordingly, the board connector 1 according to the present disclosure may improve the ease of manufacture of each of the first receptacle grounding member 51 and the first receptacle RF contact 41 and, through the receptacle cutting hole 4*a*, reduce the possibility that the first receptacle grounding member 51 and the first receptacle RF contact 41 are grounded to each other. Therefore, the board connector 1 according to the present disclosure may improve the performance of each of the first receptacle grounding member 51 and the first receptacle RF contact 41.

A single receptacle cutting hole 4*a* may be formed at each of both sides of the first receptacle RF contact 41 and the second receptacle RF contact 42. In the case in which the receptacle RF contact 4 includes the two RF contacts 41 and 42, the board connector 1 according to the present disclosure may include four receptacle cutting holes 4*a*. FIG. 9 illustrates four receptacle cutting holes 4*a*, but this is only illustrative, and the board connector 1 according to the present disclosure may also include three or less receptacle cutting holes 4*a* or five or more receptacle cutting holes 4*a*.

The receptacle cutting hole 4*a* may communicate with a receptacle communication hole 26 (see FIG. 12) formed in the receptacle insulating part 2. The receptacle communication hole 26 may be formed in a larger size than the receptacle cutting hole 4*a*. The receptacle communication hole 26 may be formed in a rectangular parallelepiped shape as a whole. The receptacle communication hole 26 may be disposed in the first direction (the direction indicated by the arrow FD) from the receptacle cutting hole 4*a*. The receptacle communication hole 26 and the receptacle cutting hole 4*a* may also be formed together by performing press machining one time.

Referring to FIGS. 9 to 12, the first receptacle grounding member 51 may include a first receptacle grounding mounting member 511.

The first receptacle grounding mounting member 511 is mounted on the first board 10A. The first receptacle grounding member 51 may be mounted on the first board 10A through the first receptacle grounding mounting member 511. The first receptacle grounding mounting member 511 may protrude toward a first receptacle RF mounting member 412 of the first receptacle RF contact 41. In this case, the first receptacle RF mounting member 412 may protrude toward the first receptacle grounding mounting member 511. For example, the first receptacle grounding mounting member 511 may protrude a receptacle grounding protruding distance 511L, and the first receptacle RF mounting member 412 may protrude a receptacle RF protruding distance 412L.

Figure 12:
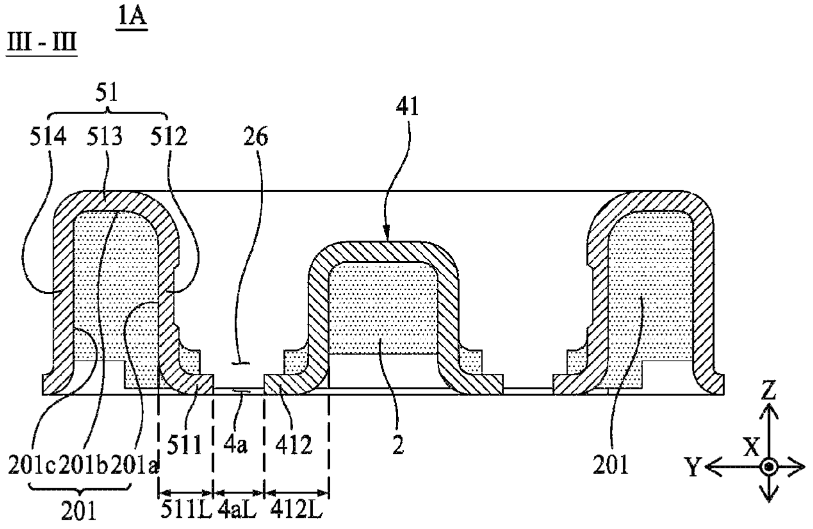
FIG. 12 is a schematic side view of the board connector according to the present disclosure that is taken along cross-sectional line of FIG. 9.

As illustrated in FIG. 12, a surface of the first receptacle grounding mounting member 511 that is mounted on the first board 10A (see FIG. 6) and a surface of the first receptacle RF mounting member 412 that is mounted on the first board 10A (see FIG. 6) may be disposed on the same horizontal plane. In this case, the surface of the first receptacle grounding mounting member 511 that is mounted on the first board 10A (see FIG. 6) may correspond to a lower surface of the first receptacle grounding mounting member 511. The surface of the first receptacle RF mounting member 412 that is mounted on the first board 10A (see FIG. 6) may correspond to a lower surface of the first receptacle RF mounting member 412.

The first receptacle grounding member 51 may also include a plurality of first receptacle grounding mounting members 511. The first receptacle grounding mounting members 511 may be disposed to be spaced apart from the first receptacle RF mounting member 412 in different directions. In this case, the first receptacle RF mounting member 412 may be disposed at an inner side of the first receptacle grounding mounting members 511. Accordingly, the board connector 1 according to the present disclosure may implement a shielding force for the first receptacle RF mounting member 412 using the first receptacle grounding mounting members 511. For example, as illustrated in FIG. 10, the first receptacle grounding member 51 may include four first receptacle grounding mounting members 511*a*, 511*b*, 511*c*, and 511*d*. In this case, the first receptacle grounding mounting members 511*a*, 511*b*, 511*c*, and 511*d* may be disposed to surround four surfaces of the first receptacle RF mounting member 412. In this way, since the first receptacle grounding mounting members 511*a*, 511*b*, 511*c*, and 511*d* are disposed to surround as many surfaces of the first receptacle RF mounting member 412 as possible, the board connector 1 according to the present disclosure may improve RF blocking performance relating to the first receptacle RF mounting member 412. The first receptacle grounding mounting members 511*a*, 511*b*, 511*c*, and 511*d* may be disposed to be spaced apart from each other.

Figure 11:
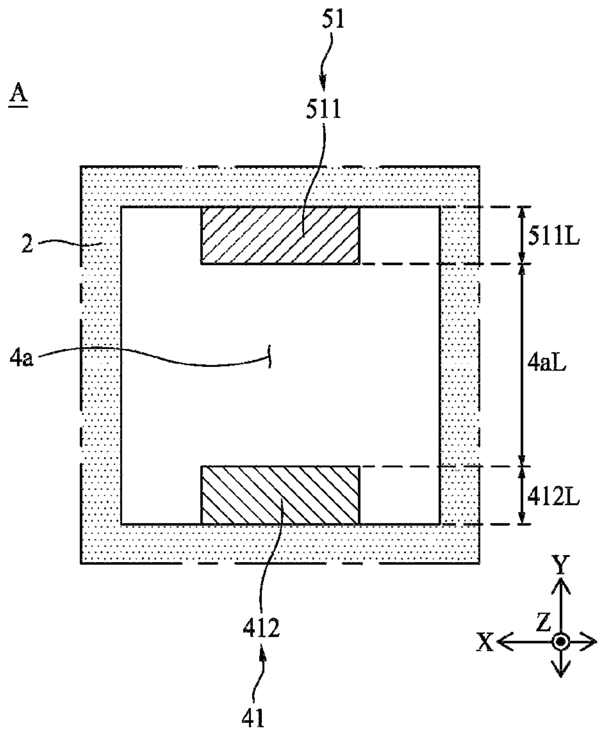
FIG. 11 is a schematic enlarged view of portion A of FIG. 9.

As illustrated in FIGS. 11 and 12, the receptacle cutting hole 4*a* may be formed to have a size 4*a*L (see FIGS. 11 and 12) that is larger than each of the receptacle grounding protruding distance 511L and the receptacle RF protruding distance 412L. Accordingly, by increasing a separation distance between the first receptacle grounding member 51 and the first receptacle RF contact 41 through the receptacle cutting hole 4*a*, the board connector 1 according to the present disclosure may further reduce the possibility that the first receptacle grounding member 51 and the first receptacle RF contact 41 are grounded to each other. In FIG. 11, the hatching is for distinguishing configurations instead of indicating cross-sections.

Meanwhile, through the receptacle cutting hole 4*a*, each of the first receptacle grounding mounting members 511 and the first receptacle RF mounting member 412 may be exposed to the outside. In this case, a portion of the first receptacle grounding mounting members 511 and a portion of the first receptacle RF mounting member 412 may be exposed to the outside through the receptacle cutting hole 4*a*.

Referring to FIGS. 8 to 13, the first receptacle grounding member 51 may be coupled to a first sidewall 201 of the receptacle insulating part 2. The first sidewall 201 may correspond to a portion of the receptacle insulating member 20. The first receptacle RF contact 41 may be coupled to the first RF protrusion 221 so as to be disposed at a position spaced apart from each of the first sidewall 201 and the transmission protrusion 21. In this case, the first sidewall 201 may be disposed to cover at least two sides of the first receptacle RF contact 41 at a position spaced apart from the first receptacle RF contact 41. For example, as illustrated in FIG. 8, by the first sidewall 201 covering three sides of the first receptacle RF contact 41 and the transmission protrusion 21 covering one side of the first receptacle RF contact 41, four covered sides of the first receptacle RF contact 41 may be implemented. In this case, the first sidewall 201 may be formed in a right-angled U-shape as a whole. The first sidewall 201 may include a plurality of first sidewall members. For example, the first sidewall 201 may include three first sidewall members, and the three first sidewall members may be disposed to constitute the right-angled U-shape.

The first receptacle grounding member 51 may be coupled to the first sidewall 201 at a position spaced apart from the first receptacle RF contact 41. Accordingly, the first receptacle grounding member 51 may be disposed to cover at least two sides of the first receptacle RF contact 41 at a position spaced apart from the first receptacle RF contact 41. Accordingly, the first receptacle grounding member 51 may implement a shielding force that blocks a RF electromagnetic wave radiated from the first receptacle RF contact 41 from flowing to the outside. In a case in which the first sidewall 201 includes a plurality of first sidewall members, the first receptacle grounding member 51 may be coupled to at least two of the first sidewall members. The first receptacle grounding member 51 may also be coupled to all of the first sidewall members.

The first receptacle grounding member 51 may doubly implement the shielding force for the first receptacle RF contact 41. To this end, the first receptacle grounding member 51 may include a first receptacle grounding inner member 512, a first receptacle grounding connection member 513, and a first receptacle grounding outer member 514.

The first receptacle grounding inner member 512 is disposed between the first sidewall 201 and the first receptacle RF contact 41. The first receptacle grounding inner member 512 may be disposed to cover a first sidewall inner surface 201*a* (see FIGS. 12 and 13) of the first sidewall 201. The first sidewall inner surface 201*a* is a surface of the first sidewall 201 that is disposed to face the first receptacle RF contact 41.

The first receptacle grounding connection member 513 connects the first receptacle grounding inner member 512 and the first receptacle grounding outer member 514 to each other. The first receptacle grounding connection member 513 may have one side coupled to the first receptacle grounding inner member 512 and the other side coupled to the first receptacle grounding outer member 514. The first receptacle grounding connection member 513 may be disposed to come in contact with a first sidewall upper surface 201*b* (see FIGS. 12 and 13) of the first sidewall 201. The first sidewall upper surface 201*b* is a surface of the first sidewall 201 that is disposed to face an upper side.

The first receptacle grounding outer member 514 is disposed opposite to the first receptacle grounding inner member 512. Accordingly, the first receptacle grounding outer member 514 and the first receptacle grounding inner member 512 may be disposed to double-shield the first receptacle RF contact 41 at a position spaced apart from the first receptacle RF contact 41. Therefore, the first receptacle grounding member 51 is implemented to further strengthen the shielding force blocking the RF electromagnetic wave radiated from the first receptacle RF contact 41 from flowing to the outside. The first sidewall 201 may be disposed between the first receptacle grounding outer member 514 and the first receptacle grounding inner member 512. By the first sidewall 201 being inserted between the first receptacle grounding outer member 514 and the first receptacle grounding inner member 512, the first receptacle grounding member 51 may be coupled to the first sidewall 201. The first receptacle grounding outer member 514 may be disposed to cover a first sidewall outer surface 201*c* (see FIGS. 12 and 13) of the first sidewall 201. The first sidewall outer surface 201*c* is a surface of the first sidewall 201 that is disposed to face a direction opposite to the first sidewall inner surface 201*a*. The first receptacle grounding outer member 514, the first receptacle grounding connection member 513, and the first receptacle grounding inner member 512 may also be integrally formed.

The first receptacle grounding member 51 may include a first receptacle grounding corner member 515.

The first receptacle grounding corner member 515 may be disposed to cover a first sidewall corner 201*d* of the first sidewall outer surface 201*c*. The first sidewall corner 201*d* may be a portion of the first sidewall outer surface 201*c* that corresponds to a corner. Accordingly, the first receptacle grounding member 51 may shield the first sidewall corner 201*d* side using the first receptacle grounding corner member 515. Therefore, the board connector 1 according to the present disclosure may further strengthen a shielding force for ultra-high frequencies that are mostly radiated near the first sidewall corner 201*d*.

The first receptacle grounding corner member 515 and the first receptacle grounding outer member 514 may be formed to be connected to each other to cover the first sidewall outer surface 201*c* having the first sidewall corner 201*d*. The first receptacle grounding corner member 515, the first receptacle grounding outer member 514, the first receptacle grounding connection member 513, the first receptacle grounding inner member 512, and the first receptacle grounding mounting member 511 may also be integrally formed.

Referring to FIGS. 8 to 10, the receptacle grounding part 5 may include a second receptacle grounding member 52.

The second receptacle grounding member 52 may be disposed at a position spaced apart from the first receptacle grounding member 51. The second receptacle grounding member 52 may be disposed to cover at least two sides of the second receptacle RF contact 42 at a position spaced apart from the second receptacle RF contact 42. Accordingly, through the second receptacle grounding member 52, the board connector 1 according to the present disclosure may implement a shielding force that blocks a RF electromagnetic wave radiated from the second receptacle RF contact 42 from flowing to the outside.

The second receptacle grounding member 52 may also be formed to cover all sides of the second receptacle RF contact 42 at a position spaced apart from the second receptacle RF contact 42. In this case, the second receptacle RF contact 42 may be disposed at an inner side of the second receptacle grounding member 52. Accordingly, the board connector 1 according to the present disclosure may further strengthen the shielding force using the second receptacle grounding member 52. The second receptacle grounding member 52 may be formed to cover four sides of the second receptacle RF contact 42 at a position spaced apart from the second receptacle RF contact 42. The second receptacle grounding member 52 and the first receptacle grounding member 51 may also be integrally formed with each other.

The receptacle cutting hole 4*a* may be formed between the second receptacle grounding member 52 and the second receptacle RF contact 42. In a case in which the second receptacle grounding member 52 and the second receptacle RF contact 42 are integrally formed using a single plate material, the receptacle cutting hole 4*a* may be formed by performing press machining one time.

The second receptacle grounding member 52 may include a second receptacle grounding mounting member.

The second receptacle grounding mounting member is mounted on the first board 10A. The second receptacle grounding member 52 may be mounted on the first board 10A through the second receptacle grounding mounting member. The second receptacle grounding mounting member may protrude toward a second receptacle RF mounting member of the second receptacle RF contact 42. In this case, the second receptacle RF mounting member may protrude toward the second receptacle grounding mounting member.

A surface of the second receptacle grounding mounting member that is mounted on the first board 10A (see FIG. 6) and a surface of the second receptacle RF mounting member that is mounted on the first board 10A (see FIG. 6) may be disposed on the same horizontal plane. In this case, the surface of the second receptacle grounding mounting member that is mounted on the first board 10A (see FIG. 6) may correspond to a lower surface of the second receptacle grounding mounting member. The surface of the second receptacle RF mounting member that is mounted on the first board 10A (see FIG. 6) may correspond to a lower surface of the second receptacle RF mounting member.

The second receptacle grounding member 52 may also include a plurality of second receptacle grounding mounting members. The second receptacle grounding mounting members may be disposed to be spaced apart from the second receptacle RF mounting member in different directions. In this case, the second receptacle RF mounting member may be disposed at an inner side of the second receptacle grounding mounting members. Accordingly, the board connector 1 according to the present disclosure may implement a shielding force for the second receptacle RF mounting member using the second receptacle grounding mounting members. For example, the second receptacle grounding member 52 may include four second receptacle grounding mounting members. In this case, the second receptacle grounding mounting members may be disposed to surround four surfaces of the second receptacle RF mounting member. The second receptacle grounding mounting members may be disposed to be spaced apart from each other.

The receptacle cutting hole 4*a* may be formed to have a size that is larger than each of the second receptacle grounding mounting member and the second receptacle RF mounting member. Accordingly, the board connector 1 according to the present disclosure may be implemented to increase a separation distance between the second receptacle grounding member 52 and the second receptacle RF contact 42 through the receptacle cutting hole 4*a*.

Referring to FIGS. 8 to 13, the second receptacle grounding member 52 may be coupled to a second sidewall 202 (see FIG. 8) of the receptacle insulating part 2. The second sidewall 202 may correspond to a portion of the receptacle insulating member 20. The transmission protrusion 21 may be disposed between the second sidewall 202 and the first sidewall 201. The second receptacle RF contact 42 may be coupled to the second RF protrusion 222 so as to be disposed at a position spaced apart from each of the second sidewall 202 and the transmission protrusion 21. In this case, the second sidewall 202 may be disposed to cover at least two sides of the second receptacle RF contact 42 at a position spaced apart from the second receptacle RF contact 42. For example, as illustrated in FIG. 8, by the second sidewall 202 covering three sides of the second receptacle RF contact 42 and the transmission protrusion 21 covering one side of the second receptacle RF contact 42, four covered sides of the second receptacle RF contact 42 may be implemented. In this case, the second sidewall 202 may be formed in a right-angled U-shape as a whole. The second sidewall 202 may include a plurality of second sidewall members. For example, the second sidewall 202 may include three second sidewall members, and the three second sidewall members may be disposed to constitute the right-angled U-shape.

The second receptacle grounding member 52 may be coupled to the second sidewall 202 at a position spaced apart from the second receptacle RF contact 42. Accordingly, the second receptacle grounding member 52 may be disposed to cover at least two sides of the second receptacle RF contact 42 at a position spaced apart from the second receptacle RF contact 42. Therefore, the second receptacle grounding member 52 may implement a shielding force that blocks a RF electromagnetic wave radiated from the second receptacle RF contact 42 from flowing to the outside. In a case in which the second sidewall 202 includes a plurality of second sidewall members, the second receptacle grounding member 52 may be coupled to at least two of the second sidewall members. The second receptacle grounding member 52 may also be coupled to all of the second sidewall members.

The second receptacle grounding member 52 may doubly implement the shielding force for the second receptacle RF contact 42. To this end, the second receptacle grounding member 52 may include a second receptacle grounding inner member 521, a second receptacle grounding connection member 522, and a second receptacle grounding outer member 523.

The second receptacle grounding inner member 521 is disposed between the second sidewall 202 and the second receptacle RF contact 42. The second receptacle grounding inner member 521 may be disposed to cover a second sidewall inner surface of the second sidewall 202. The second sidewall inner surface is a surface of the second sidewall 202 that is disposed to face the second receptacle RF contact 42.

The second receptacle grounding connection member 522 connects the second receptacle grounding inner member 521 and the second receptacle grounding outer member 523 to each other. The second receptacle grounding connection member 522 may have one side coupled to the second receptacle grounding inner member 521 and the other side coupled to the second receptacle grounding outer member 523. The second receptacle grounding connection member 522 may be disposed to come in contact with a second sidewall upper surface of the second sidewall 202. The second sidewall upper surface is a surface of the second sidewall 202 that is disposed to face an upper side.

The second receptacle grounding outer member 523 is disposed opposite to the second receptacle grounding inner member 521. Accordingly, the second receptacle grounding outer member 523 and the second receptacle grounding inner member 521 may be disposed to double-shield the second receptacle RF contact 42 at a position spaced apart from the second receptacle RF contact 42. Therefore, the second receptacle grounding member 52 is implemented to further strengthen the shielding force blocking the RF electromagnetic wave radiated from the second receptacle RF contact 42 from flowing to the outside. The second sidewall 202 may be disposed between the second receptacle grounding outer member 523 and the second receptacle grounding inner member 521. By the second sidewall 202 being inserted between the second receptacle grounding outer member 523 and the second receptacle grounding inner member 521, the second receptacle grounding member 52 may be coupled to the second sidewall 202. The second receptacle grounding outer member 523 may be disposed to cover a second sidewall outer surface of the second sidewall 202. The second sidewall outer surface is a surface of the second sidewall 202 that is disposed to face a direction opposite to the second sidewall inner surface. The second receptacle grounding outer member 523, the second receptacle grounding connection member 522, and the second receptacle grounding inner member 521 may also be integrally formed.

The second receptacle grounding member 52 may include a second receptacle grounding corner member 524.

The second receptacle grounding corner member 524 may be disposed to cover a second sidewall corner of the second sidewall outer surface. The second sidewall corner may be a portion of the second sidewall outer surface that corresponds to a corner. Accordingly, the second receptacle grounding member 52 may shield the second sidewall corner side using the second receptacle grounding corner member 524. Therefore, the board connector 1 according to the present disclosure may further strengthen a shielding force for ultra-high frequencies that are mostly radiated near the second sidewall corner.

The second receptacle grounding corner member 524 and the second receptacle grounding outer member 523 may be formed to be connected to each other to cover the second sidewall outer surface having the second sidewall corner.

The second receptacle grounding corner member 524, the second receptacle grounding outer member 523, the second receptacle grounding connection member 522, the second receptacle grounding inner member 521, and the first receptacle grounding mounting member 511 may also be integrally formed.

Figure 5:
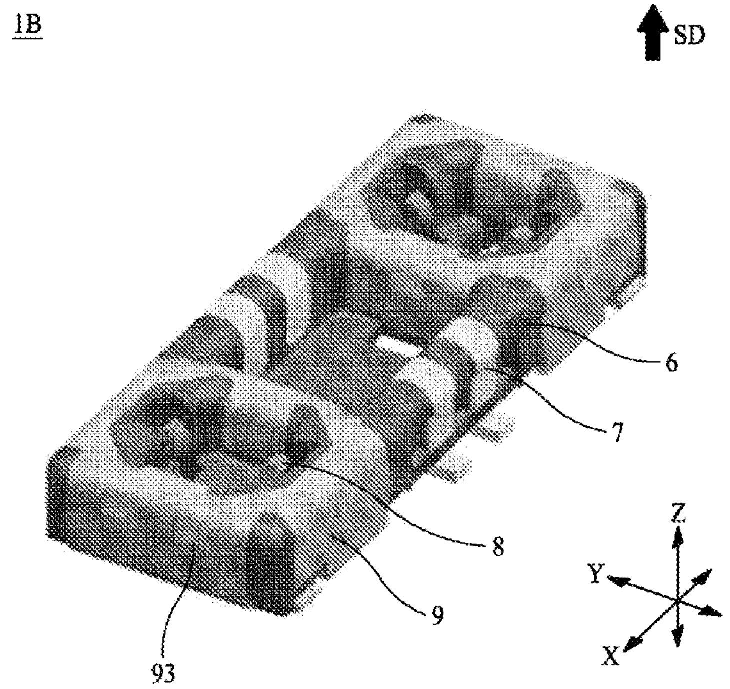
FIG. 5 is a schematic perspective view relating to the plug connector in the board connector according to the present disclosure.
Figure 6:
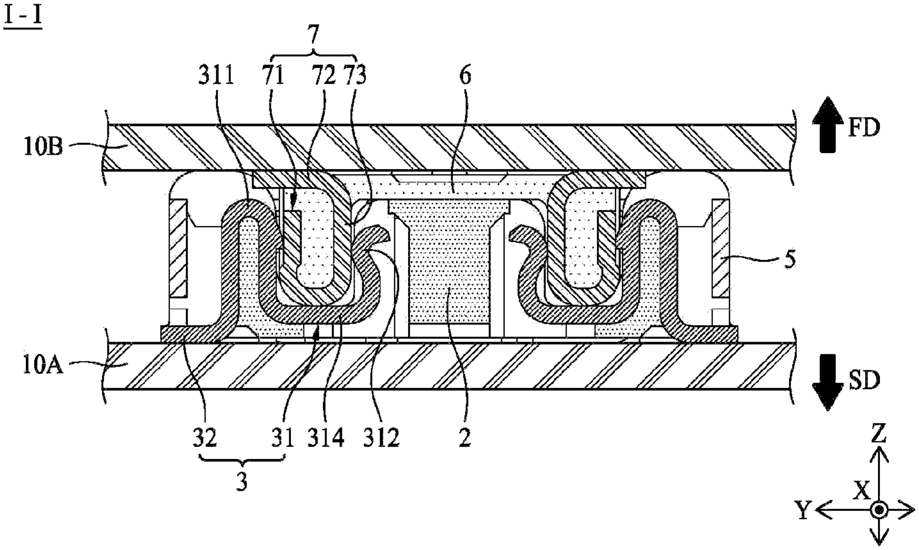
FIG. 6 is a schematic side view of the board connector according to the present disclosure that is taken along cross-sectional line I-I of FIG. 2.
Figure 7:
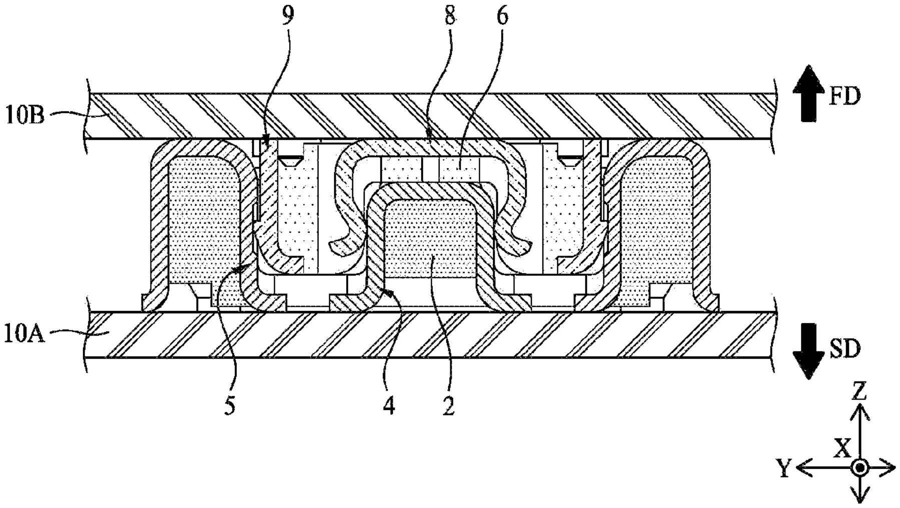
FIG. 7 is a schematic side view of the board connector according to the present disclosure that is taken along cross-sectional line II-II of FIG. 2.

Referring to FIGS. 2, 3, 5 to 7, and 14 to 16, the plug insulating part 6 is for coupling to the second board 10B. The plug insulating part 6 may be coupled to the second board 10B through the plug grounding part 9. The plug insulating part 6 may support the plug transmission contact 7 and the plug RF contact 8 as the plug transmission contact 7 and the plug RF contact 8 are coupled to each other. A plurality of plug transmission contacts 7 may be coupled to the plug insulating part 6. In this case, the plug transmission contacts 7 may be disposed to be spaced apart from each other in the first axial direction (X-axis direction). In the receptacle insulating part 2, the plug transmission contacts 7 may be disposed to be spaced apart from each other in the first axial direction (X-axis direction) while forming a plurality of columns. For example, as illustrated in FIG. 5, in the receptacle insulating part 2, the plug transmission contacts 7 may be disposed to be spaced apart from each other in the first axial direction (X-axis direction) while forming two columns. The plug insulating part 6 may be formed of a material having an electrical insulating property. The plug insulating part 6 may be formed in a rectangular parallelepiped shape as a whole.

The plug insulating part 6 may be coupled to the receptacle insulating part 2 by moving in a second direction (a direction indicated by an arrow SD (see FIG. 3)). Accordingly, the plug connector 1B and the receptacle connector 1A may be electrically connected to each other. Although the above description is based on a case in which the receptacle insulating part 2 and the plug insulating part 6 are coupled to each other as the plug insulating part 6 moves, this is only illustrative, and for the receptacle insulating part 2 and the plug insulating part 6 to be coupled to each other, the receptacle insulating part 2 may move in the first direction (the direction indicated by the arrow FD), or the plug insulating part 6 may move in the second direction (the direction indicated by the arrow SD) while the receptacle insulating part 2 moves in the first direction (the direction indicated by the arrow FD). The second direction (the direction indicated by the arrow SD) may be a direction opposite to the first direction (the direction indicated by the arrow FD).

The plug insulating part 6 may include a second transmission coupling groove (not illustrated). The plug transmission contact 7 may be coupled to the plug insulating part 6 by being inserted into the second transmission coupling groove. The plug insulating part 6 and the plug transmission contact 7 may also be coupled to each other through insert molding. The second transmission coupling groove may be formed in a plug insulating member 60 of the plug insulating part 6. The plug insulating member 60 may serve as a main body of the plug insulating part 6. In a case in which the board connector 1 according to the present disclosure includes the plurality of plug transmission contacts 7, the plug insulating part 6 may include a plurality of second transmission coupling grooves. The plug insulating part 6 may include as many second transmission coupling grooves as the number of plug transmission contacts 7.

The plug insulating part 6 may include a second RF coupling groove (not illustrated). The plug RF contact 8 may be coupled to the plug insulating part 6 by being inserted into the second RF coupling groove. The plug insulating part 6 and the plug RF contact 8 may also be coupled to each other through insert molding. The second RF coupling groove may be formed in the plug insulating member 60. In a case in which the plug RF contact 8 includes a plurality of RF contacts, the plug insulating part 6 may include a plurality of second RF coupling grooves. The plug insulating part 6 may include as many second RF coupling grooves as the number of RF contacts belonging to the plug RF contact 8.

Figure 14:
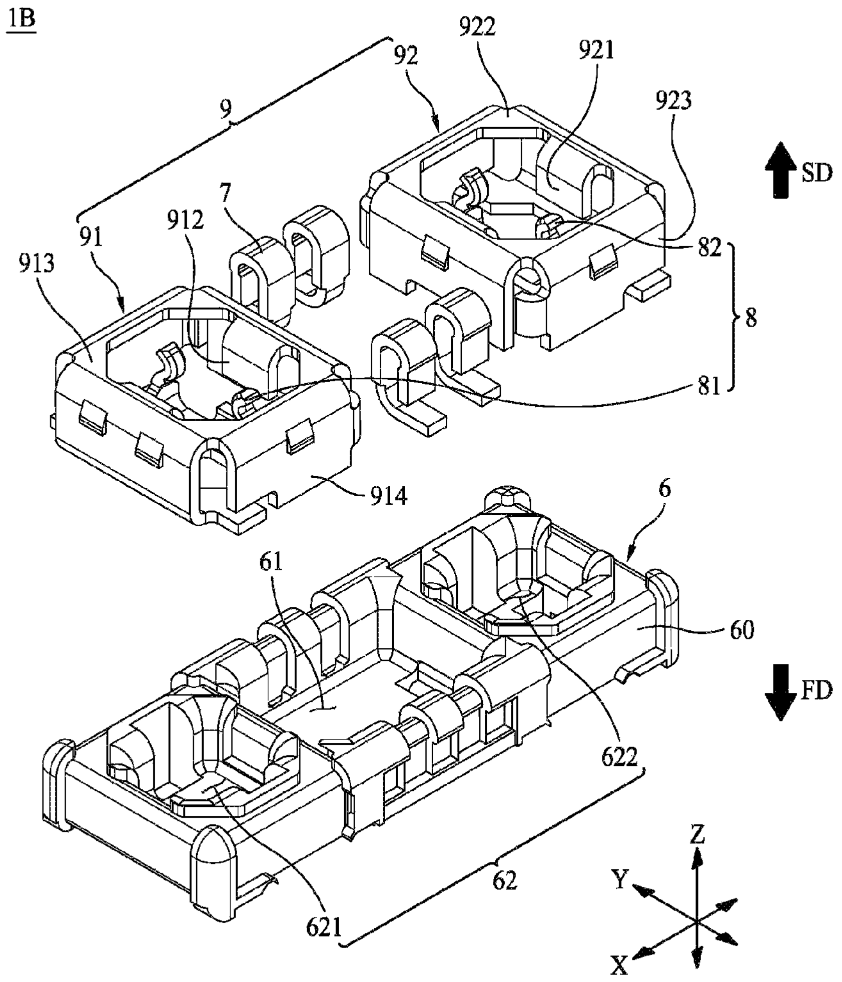
FIG. 14 is a schematic exploded perspective view for illustrating a configuration of the plug connector in the board connector according to the present disclosure.

Referring to FIG. 14, the plug insulating part 6 may include a transmission accommodation groove 61 and a RF accommodation groove 62.

The transmission protrusion 21 is inserted into the transmission accommodation groove 61. The plug transmission contact 7 and the receptacle transmission contact 3 may be connected to each other as the transmission protrusion 21 is inserted into the transmission accommodation groove 61. The transmission accommodation groove 61 may be formed in a shape that corresponds to the shape of the transmission protrusion 21 so that the transmission protrusion 21 may be inserted into the transmission accommodation groove 61. The transmission accommodation groove 61 may be formed so that the plug transmission contact 7 and the second transmission coupling groove (not illustrated) are disposed at an outer side thereof. The transmission accommodation groove 61 may be disposed at an intermediate point of the plug insulating part 6. The transmission accommodation groove 61 may be formed in a rectangular parallelepiped shape as a whole.

The RF protrusion 22 is inserted into the RF accommodation groove 62. The plug RF contact 8 and the receptacle RF contact 4 may be connected to each other as the transmission protrusion 21 is inserted into the RF accommodation groove 62. The RF accommodation groove 62 may be formed in a shape that corresponds to the shape of the RF protrusion 22 so that the RF protrusion 22 may be inserted into the RF accommodation groove 62. The RF accommodation groove 62 may be disposed at a point spaced apart from the transmission accommodation groove 61. The RF accommodation groove 62 may be formed in a rectangular parallelepiped shape as a whole. In a case in which the RF protrusion 22 includes the two RF protrusions 221 and 222, the RF accommodation groove 62 may include a first RF accommodation groove 621 and a second RF accommodation groove 622. In this case, the first RF protrusion 221 may be inserted into the first RF accommodation groove 621, and the second RF protrusion 222 may be inserted into the second RF accommodation groove 622. The first RF accommodation groove 621 and the second RF accommodation groove 622 may be disposed to be spaced apart from each other with respect to the transmission accommodation groove 61. The first RF accommodation groove 621 and the second RF accommodation groove 622 may be implemented to be substantially the same as each other.

The plug RF contact 8 may be accommodated in the RF accommodation groove 62. In this case, the first RF accommodation groove 621 may accommodate a first plug RF contact 81 of the plug RF contact 8, and the second RF accommodation groove 622 may accommodate a second plug RF contact 82 of the plug RF contact 8.

Figure 13:
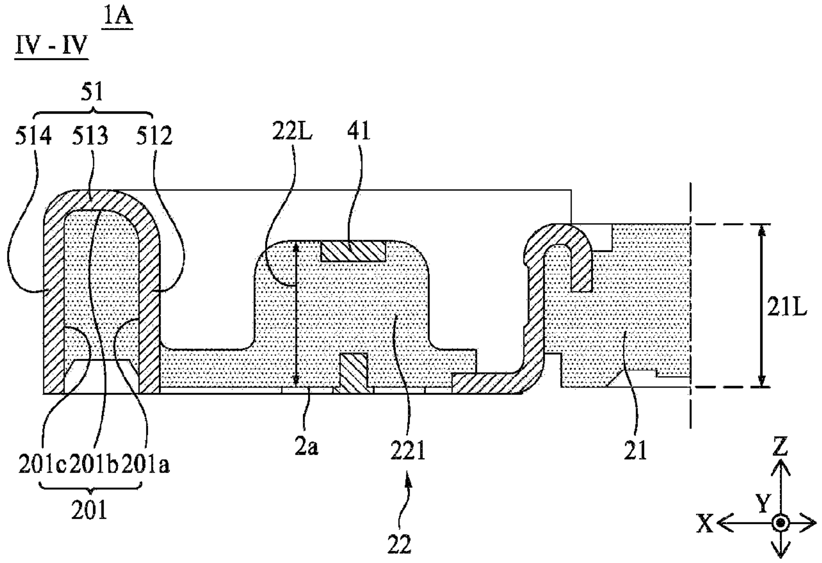
FIG. 13 is a schematic front view of the board connector according to the present disclosure that is taken along cross-sectional line IV-IV of FIG. 9.

Referring to FIGS. 9 and 13, in a case in which the plug insulating part 6 includes the transmission accommodation groove 61 and the RF accommodation groove 62, the transmission protrusion 21 and the RF protrusion 22 may be implemented as follows.

The transmission protrusion 21 may be formed to protrude a first protruding distance 21L from a lower surface 2*a* of the receptacle insulating part 2. The first protruding distance 21L may be a distance in a third axial direction (Z-axis direction). The third axial direction (Z-axis direction) may correspond to a direction parallel to each of the first direction (the direction indicated by the arrow FD) and the second direction (the direction indicated by the arrow SD) and may be a direction perpendicular to each of the first axial direction (X-axis direction) and the second axial direction (Y-axis direction).

In a case in which the transmission protrusion 21 is formed to protrude the first protruding distance 21L from the lower surface 2*a* of the receptacle insulating part 2, the RF protrusion 22 may be formed to protrude a second protruding distance 22L, which is shorter than the first protruding distance 21L, from the lower surface 2*a* of the receptacle insulating part 2. That is, in the third axial direction (Z-axis direction), the transmission protrusion 21 may be formed to be higher than the RF protrusion 22. Accordingly, in a process in which the receptacle connector 1A and the plug connector 1B are coupled to each other, the transmission protrusion 21 may be implemented to be coupled before the RF protrusion 22 and perform a guide function and an alignment function. Therefore, in the process in which the receptacle connector 1A and the plug connector 1B are coupled to each other, the transmission protrusion 21 may prevent damage to the RF contact portions 4 and 8, which are elements sensitive to impedance matching, to prevent degradation of high frequency transmission performance which is implemented through the RF contact portions 4 and 8. Also, in a case in which the receptacle connector 1A and the plug connector 1B are coupled to each other in a misaligned state, an impact applied due to the misalignment is applied to the transmission protrusion 21 first. Accordingly, the transmission protrusion 21 may reduce the impact applied to the RF protrusion 22 and the RF contact portions 4 and 8 due to the misalignment. Although not illustrated, the transmission protrusion 21 and the RF protrusion 22 may also be formed to protrude the same protruding distance from the lower surface 2*a* of the receptacle insulating part 2.

Figure 16:
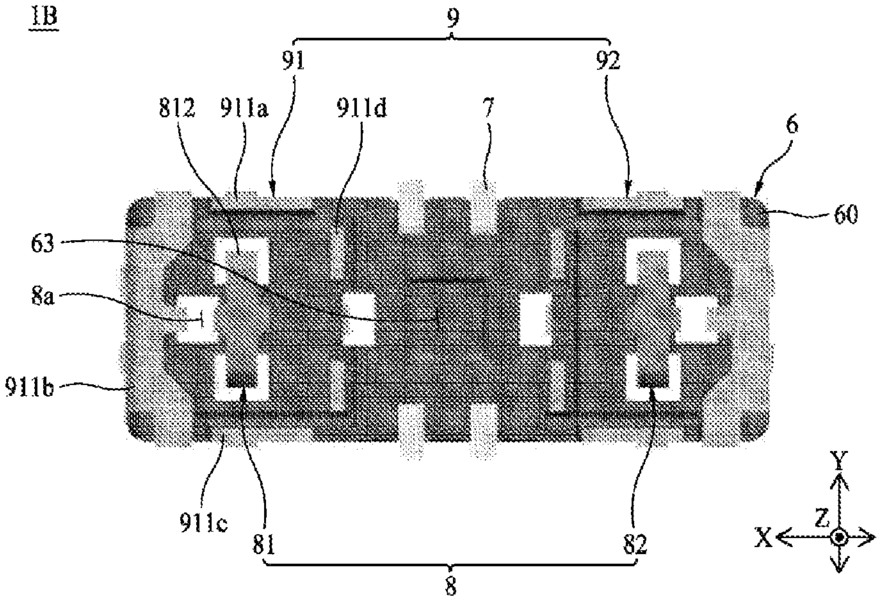
FIG. 16 is a schematic bottom view relating to the plug connector in the board connector according to the present disclosure.

Referring to FIG. 16, a plug injection groove 63 may be formed in the plug insulating part 6.

The plug injection groove 63 may be a portion into which an injection resin for forming the plug insulating part 6 is injected. The plug injection groove 63 may be formed to be recessed to a predetermined depth from a lower surface of the plug insulating member 60. The plug injection groove 63 may be spaced apart from the second board 10B. The plug injection groove 63 may be formed in a rectangular parallelepiped shape as a whole. The plug injection groove 63 may be formed at a point that is equidistant from the first plug RF contact 81 and the second plug RF contact 82. The plug injection groove 63 may also be formed at an intermediate point of each of the plug RF contact 8 and the plug grounding part 9.

Referring to FIGS. 2, 3, 5, 6, and 14 to 18, the plug transmission contact 7 is mounted on the second board 10B. The plug transmission contact 7 may be connected to the receptacle transmission contact 3. The plug transmission contact 7 may be formed of a material having conductivity.

The plug transmission contact 7 is coupled to the plug insulating part 6. A plurality of plug transmission contacts 7 may be coupled to the plug insulating part 6. The plug transmission contacts 7 may be coupled to the plug insulating part 6 so as to be spaced apart from each other in the first axial direction (X-axis direction) while forming a plurality of columns. FIG. 5 illustrates a case in which four plug transmission contacts 7 are coupled to the plug insulating part 6 so as to be spaced apart from each other in the first axial direction (X-axis direction) while forming two columns spaced apart in the second axial direction (Y-axis direction). The transmission accommodation groove 61 may be disposed between the plug transmission contacts 7 constituting the plurality of columns. Since the plug transmission contacts 7 are implemented to have the same form and function, hereinafter, detailed description will be given on the basis of a single plug transmission contact 7.

Figure 17:
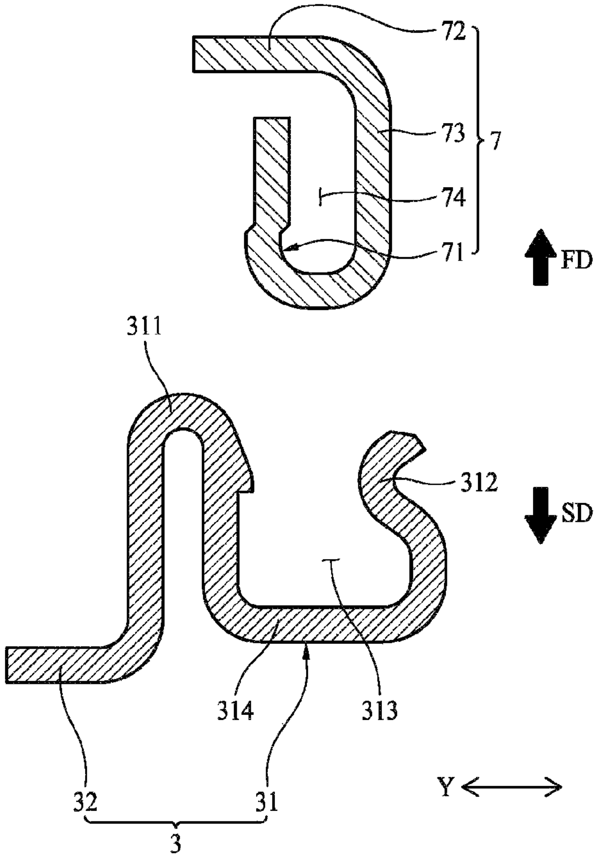
FIG. 17 is a schematic side cross-sectional view of a state before a first transmission contact and a second transmission contact are coupled to each other that is taken along cross-sectional line I-I of FIG. 2.
Figure 18:
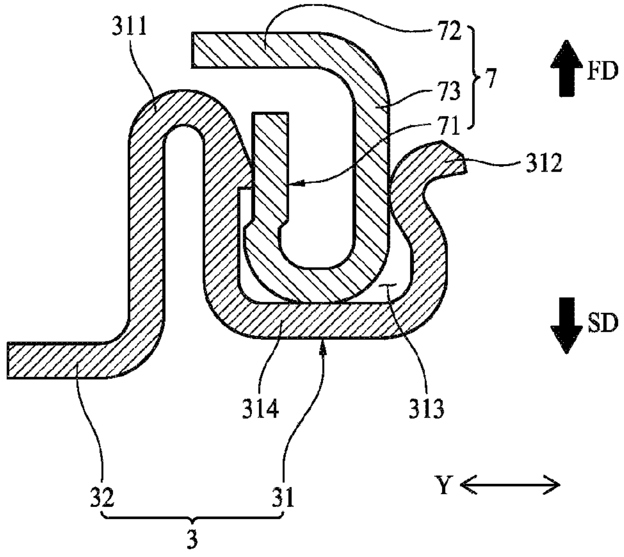
FIG. 18 is a schematic side cross-sectional view of a state after the first transmission contact and the second transmission contact are coupled to each other that is taken along cross-sectional line I-I of FIG. 2.

Referring to FIGS. 17 and 18, the plug transmission contact 7 may include a plug transmission coupling member 71.

The plug transmission coupling member 71 is for linking to the receptacle transmission contact 3. The plug transmission contact 7 may be coupled to the plug insulating part 6 so that the plug transmission coupling member 71 is disposed at an outer side of the transmission accommodation groove 61. The plug transmission coupling member 71 may be formed of a material having conductivity. The plug transmission coupling member 71 may be formed in a U-shape as a whole.

Referring to FIGS. 17 and 18, the plug transmission contact 7 may include a plug transmission mounting member 72 and a plug transmission connection member 73.

The plug transmission mounting member 72 is for mounting on the second board 10B. The plug transmission contact 7 is electrically connected to the second board 10B by the plug transmission mounting member 72 being mounted on the second board 10B. The plug transmission mounting member 72 may be formed of a material having conductivity. The plug transmission contact 7 may be coupled to the plug insulating part 6 so that the plug transmission mounting member 72 protrudes to an outer side of the plug insulating part 6 as illustrated in FIG. 5.

The plug transmission connection member 73 connects the plug transmission mounting member 72 and the plug transmission coupling member 71 to each other. The plug transmission connection member 73 may be formed of a material having conductivity. The plug transmission connection member 73, the plug transmission mounting member 72, and the plug transmission coupling member 71 may also be integrally formed. An elastic groove 74 may be formed between the plug transmission connection member 73 and the plug transmission coupling member 71. Accordingly, the plug transmission connection member 73 and the plug transmission coupling member 71 may elastically move in the second axial direction (Y-axis direction) as the receptacle transmission contact 3 and the plug transmission contact 7 are connected to each other.

Referring to FIGS. 17 and 18, for the plug transmission contact 7 and the receptacle transmission contact 3 to be connected to each other, the receptacle transmission contact 3 may include the following configuration.

The receptacle transmission contact 3 may include a receptacle transmission coupling member 31.

The receptacle transmission coupling member 31 is connected to the plug transmission contact 7 for electrical connection between the first board 10A and the second board 10B. The receptacle transmission coupling member 31 may be connected to the plug transmission coupling member 71. The receptacle transmission contact 3 may be coupled to the receptacle insulating part 2 so that the receptacle transmission coupling member 31 is disposed in the seating groove 23 as illustrated in FIG. 9. The receptacle transmission coupling member 31 may be formed of a material having conductivity.

Referring to FIGS. 17 and 18, the receptacle transmission coupling member 31 may include a first receptacle transmission branch member 311 and a second receptacle transmission branch member 312.

The first receptacle transmission branch member 311 is connected to the plug transmission contact 7. The first receptacle transmission branch member 311 may be connected to the plug transmission coupling member 71 by being coupled thereto. The first receptacle transmission branch member 311 may be formed as a curved surface. As illustrated in FIGS. 17 and 18, the first receptacle transmission branch member 311 may be formed to constitute a curved surface in the second axial direction (Y-axis direction). Accordingly, the first receptacle transmission branch member 311 may move at least one of the receptacle transmission contact 3 and the plug transmission contact 7 in the second axial direction (Y-axis direction). For example, in a case in which the plug transmission contact 7 based on FIG. 17 is misaligned toward the left in the second axial direction (Y-axis direction), the plug transmission contact 7 comes in contact with the first receptacle transmission branch member 311 and then moves rightward along the curved surface of the first receptacle transmission branch member 311. Therefore, the board connector 1 according to the present disclosure may improve the accuracy and ease in connecting the receptacle transmission contact 3 and the plug transmission contact 7 to each other.

The second receptacle transmission branch member 312 is disposed to be spaced apart from the first receptacle transmission branch member 311. The second receptacle transmission branch member 312 and the first receptacle transmission branch member 311 may be disposed to be spaced apart from each other in the second axial direction (Y-axis direction). The second receptacle transmission branch member 312 may be connected to the plug transmission connection member 73. Accordingly, the board connector 1 according to the present disclosure may be implemented to have a so-called "double point-of-contact structure" in which the receptacle transmission contact 3 and the plug transmission contact 7 come in contact with each other at a plurality of different positions and thus may improve the connection reliability and contact stability relating to the receptacle transmission contact 3 and the plug transmission contact 7.

The second receptacle transmission branch member 312 may be formed as a curved surface. As illustrated in FIGS. 17 and 18, the second receptacle transmission branch member 312 may be formed to constitute a curved surface in the second axial direction (Y-axis direction). Accordingly, the second receptacle transmission branch member 312 may move at least one of the receptacle transmission contact 3 and the plug transmission contact 7 in a case in which the position of the receptacle transmission contact 3 and the plug transmission contact 7 is misaligned within a predetermined range in the second axial direction (Y-axis direction). For example, in a case in which the plug transmission contact 7 based on FIG. 17 is misaligned toward the right in the second axial direction (Y-axis direction), the plug transmission contact 7 comes in contact with the second receptacle transmission branch member 312 and then moves leftward along the curved surface of the second receptacle transmission branch member 312. Therefore, the board connector 1 according to the present disclosure may further improve the accuracy and ease in connecting the receptacle transmission contact 3 and the plug transmission contact 7 to each other.

Referring to FIGS. 17 and 18, the receptacle transmission coupling member 31 may include a transmission insertion groove 313.

The transmission insertion groove 313 is formed between the first receptacle transmission branch member 311 and the second receptacle transmission branch member 312. In this case, the connection between the receptacle transmission contact 3 and the plug transmission contact 7 may be performed by the plug transmission contact 7 being inserted into the transmission insertion groove 313. In this case, the receptacle transmission contact 3 may serve as a receptacle contact, and the plug transmission contact 7 may serve as a plug contact. The first receptacle transmission branch member 311 and the second receptacle transmission branch member 312 may be formed as curved surfaces to induce insertion of the receptacle transmission coupling member 31 into the transmission insertion groove 313. Although not illustrated, in a case in which the transmission insertion groove 313 is formed in the plug transmission contact 7, the receptacle transmission contact 3 may serve as a plug contact, and the plug transmission contact 7 may serve as a receptacle contact.

Referring to FIGS. 17 and 18, the receptacle transmission coupling member 31 may include a receptacle transmission connection member 314.

The receptacle transmission connection member 314 connects the second receptacle transmission branch member 312 and the first receptacle transmission branch member 311 to each other so that the second receptacle transmission branch member 312 elastically moves. The transmission insertion groove 313 may be disposed at an inner side of the receptacle transmission connection member 314, the second receptacle transmission branch member 312, and the first receptacle transmission branch member 311. Therefore, due to being pushed by the plug transmission connection member 73 in a process in which the plug transmission coupling member 71 and the plug transmission connection member 73 are inserted into the transmission insertion groove 313, the second receptacle transmission branch member 312 moves in a direction moving away from the first receptacle transmission branch member 311. Once the plug transmission coupling member 71 and the plug transmission connection member 73 are inserted into the transmission insertion groove 313, the second receptacle transmission branch member 312 moves in a direction approaching the first receptacle transmission branch member 311 due to a restoration force. Accordingly, by elastically pressing the plug transmission connection member 73, the second receptacle transmission branch member 312 may firmly maintain a state in which the receptacle transmission contact 3 and the plug transmission contact 7 are connected to each other. The receptacle transmission connection member 314, the second receptacle transmission branch member 312, and the first receptacle transmission branch member 311 may also be integrally formed.

Referring to FIGS. 17 and 18, the receptacle transmission contact 3 may include a receptacle transmission mounting member 32.

The receptacle transmission mounting member 32 is for mounting on the first board 10A. The receptacle transmission contact 3 is electrically connected to the first board 10A as the receptacle transmission mounting member 32 is mounted on the first board 10A. The receptacle transmission mounting member 32 may be formed of a material having conductivity. The receptacle transmission mounting member 32 is connected to the receptacle transmission coupling member 31. The receptacle transmission mounting member 32 may be formed to be connected to the first receptacle transmission branch member 311. In this case, the first receptacle transmission branch member 311 is disposed between the receptacle transmission mounting member 32 and the second receptacle transmission branch member 312. The receptacle transmission mounting member 32 may also be integrally formed with the receptacle transmission coupling member 31.

Referring to FIGS. 2 to 20, the plug RF contact 8 is for RF signal transmission. The plug RF contact 8 is disposed at a position spaced apart from the plug transmission contact 7. The plug RF contact 8 may be mounted on the second board 10B and connected to the receptacle RF contact 4. Accordingly, a data signal, a power signal, or the like may be transmitted between the first board 10A and the second board 10B.

The plug RF contact 8 is coupled to the plug insulating part 6. The plug RF contact 8 may be accommodated in the RF accommodation groove 62. Hereinafter, description will be given on the basis of the case in which the plug RF contact 8 includes the two RF contacts 81 and 82, but it should be apparent to those of ordinary skill in the art to which the present disclosure pertains that an embodiment of the board connector 1 according to the present disclosure in which the plug RF contact 8 includes three or more RF contacts may be derived from the description below.

Figure 15:
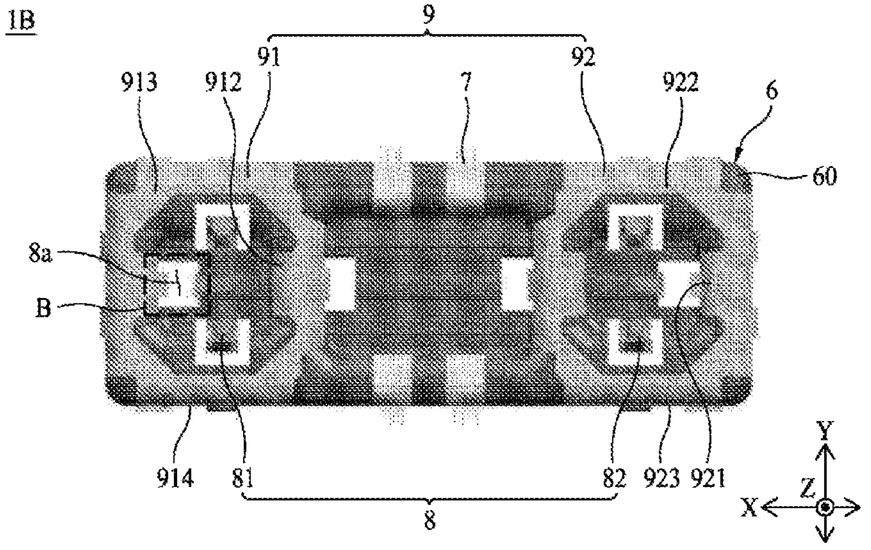
FIG. 15 is a schematic plan view relating to the plug connector in the board connector according to the present disclosure.

Referring to FIGS. 14 to 16, the plug RF contact 8 may include the first plug RF contact 81 and the second plug RF contact 82.

The first plug RF contact 81 may be a RF contact disposed at one side with respect to the plug transmission contact 7. In this case, the second plug RF contact 82 may be a RF contact disposed at the other side with respect to the plug transmission contact 7. For example, as illustrated in FIG. 15, in a case in which the first plug RF contact 81 is disposed at the left side with respect to the plug transmission contact 7, the second plug RF contact 82 may be disposed at the right side with respect to the plug transmission contact 7. The first plug RF contact 81 may be coupled to the plug insulating part 6. The first plug RF contact 81 may be accommodated in the first RF accommodation groove 621. The first plug RF contact 81 may be formed of a material having conductivity.

The first plug RF contact 81 and the second plug RF contact 82 may be disposed to be spaced apart from each other while the transmission accommodation groove 61 and the plug transmission contact 7 are disposed therebetween. Accordingly, the board connector 1 according to the present disclosure may reduce the possibility of an occurrence of RF signal interference between the RF contacts as compared to the related art in which contacts for RF signal transmission are disposed relatively close to each other. Therefore, by securing the stability of RF signal transmission, the board connector 1 according to the present disclosure may improve the overall performance of the connector. Also, the board connector 1 according to the present disclosure may increase the separation distance between the first plug RF contact 81 and the second plug RF contact 82 using the transmission accommodation groove 61 and the plug transmission contact 7. Therefore, the board connector 1 according to the present disclosure may simultaneously improve the stability of RF signal transmission and secure a space in which the plug transmission contact 7 may be disposed. Therefore, the board connector 1 according to the present disclosure may improve space utilization of contacts.

The first plug RF contact 81 is disposed at a position corresponding to the first receptacle RF contact 41 so as to be connected to the first receptacle RF contact 41. For the first plug RF contact 81 and the first receptacle RF contact 41 to be connected to each other, the first receptacle RF contact 41 and the first plug RF contact 81 may each include the following configuration.

Figure 19:
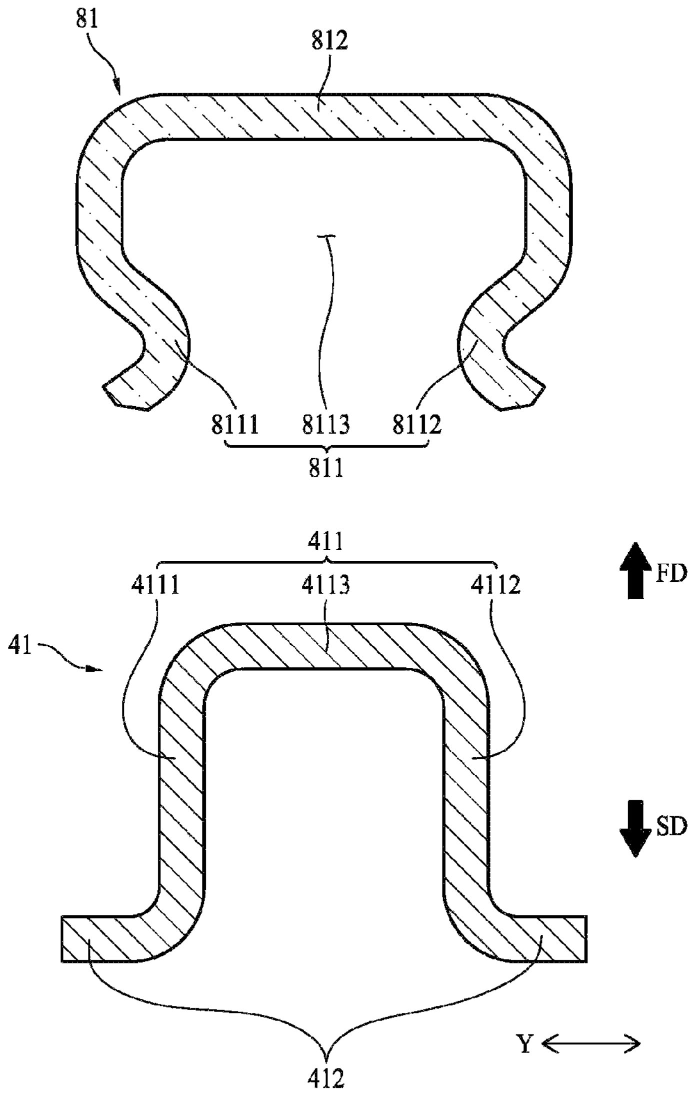
FIG. 19 is a schematic side cross-sectional view of a state before a first one-side RF contact and a second one-side RF contact are coupled to each other that is taken along cross-sectional line II-II of FIG. 2.
Figure 20:
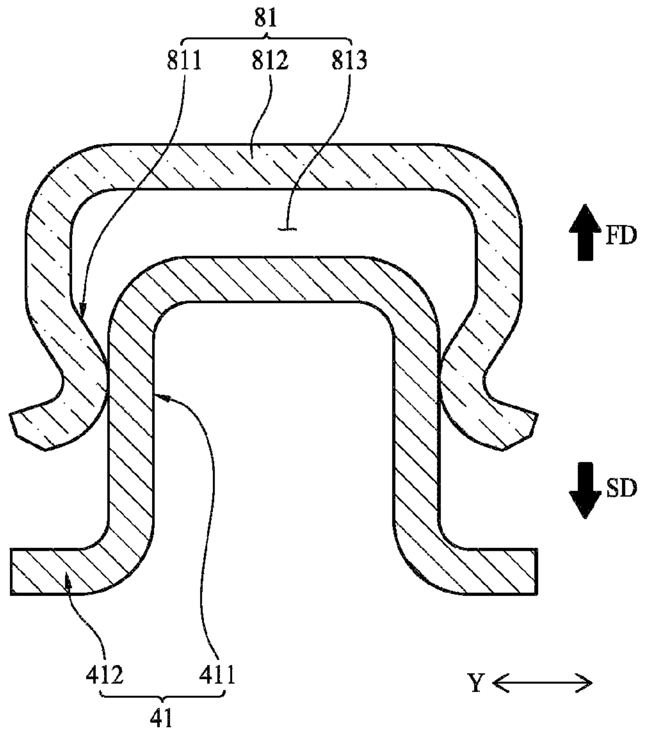
FIG. 20 a schematic side cross-sectional view of a state after the first one-side RF contact and the second one-side RF contact are coupled to each other that is taken along cross-sectional line II-II of FIG. 2.

Referring to FIGS. 19 and 20, the first receptacle RF contact 41 may include a first receptacle RF coupling member 411.

The first receptacle RF coupling member 411 is connected to the first plug RF contact 81 for electrical connection between the first board 10A and the second board 10B. The first receptacle RF contact 41 may be coupled to the receptacle insulating part 2 so that the first receptacle RF coupling member 411 is coupled to the first RF protrusion 221. The first receptacle RF coupling member 411 may be formed of a material having conductivity. The first receptacle RF coupling member 411 may be formed in an inverted U-shape as a whole.

The first receptacle RF coupling member 411 may include a first-first receptacle RF branch member 4111 and a first-second receptacle RF branch member 4112.

The first-first receptacle RF branch member 4111 is connected to the first plug RF contact 81. The first-first receptacle RF branch member 4111 may be connected to the first plug RF contact 81 by being coupled thereto.

The first-second receptacle RF branch member 4112 is connected to the first plug RF contact 81 at a position spaced apart from the first-first receptacle RF branch member 4111. The first-second receptacle RF branch member 4112 and the first-first receptacle RF branch member 4111 may be disposed to be spaced apart from each other in the second axial direction (Y-axis direction). Accordingly, the board connector 1 according to the present disclosure may be implemented to have a so-called "double point-of-contact structure" in which the first receptacle RF contact 41 and the first plug RF contact 81 come in contact with each other at a plurality of different positions and thus may improve the connection reliability and contact stability relating to the first receptacle RF contact 41 and the first plug RF contact 81.

The first receptacle RF coupling member 411 may include a first receptacle RF connection member 4113.

The first receptacle RF connection member 4113 is connected to each of the first-first receptacle RF branch member 4111 and the first-second receptacle RF branch member 4112. The first receptacle RF connection member 4113 may be disposed between the first-first receptacle RF branch member 4111 and the first-second receptacle RF branch member 4112. In this case, the first-first receptacle RF branch member 4111 and the first-second receptacle RF branch member 4112 may be disposed to be symmetrical to each other with respect to the first receptacle RF connection member 4113. The first receptacle RF connection member 4113 may be connected to each of the first-first receptacle RF branch member 4111 and the first-second receptacle RF branch member 4112 while forming a right angle therewith. The first receptacle RF connection member 4113, the first-second receptacle RF branch member 4112, and the first-first receptacle RF branch member 4111 may also be integrally formed.

Referring to FIGS. 19 and 20, the first receptacle RF contact 41 may include the first receptacle RF mounting member 412.

The first receptacle RF mounting member 412 is for mounting on the first board 10A. The first receptacle RF contact 41 is electrically connected to the first board 10A as the first receptacle RF mounting member 412 is mounted on the first board 10A. The first receptacle RF mounting member 412 may be formed of a material having conductivity. The first receptacle RF mounting member 412 is connected to the first receptacle RF coupling member 411.

The first receptacle RF mounting member 412 may be formed in a smaller size than the first receptacle RF coupling member 411. Accordingly, the board connector 1 according to the present disclosure may reduce the size of a first PCB pattern (not illustrated) formed on the first board 10A on which the first receptacle RF mounting member 412 is mounted. Therefore, the board connector 1 according to the present disclosure may reduce manufacturing costs for forming the first PCB pattern. The first receptacle RF mounting member 412 may be formed to have a shorter length than the first receptacle RF coupling member 411 in the first axial direction (X-axis direction).

Referring to FIGS. 19 and 20, the first plug RF contact 81 may include a first plug RF coupling member 811.

The first plug RF coupling member 811 is connected to the first receptacle RF coupling member 411 for electrical connection between the first board 10A and the second board 10B. The first plug RF contact 81 may be coupled to the plug insulating part 6 so that the first plug RF coupling member 811 is accommodated in the first RF accommodation groove 621. The first plug RF coupling member 811 may be formed of a material having conductivity.

The first plug RF coupling member 811 may include a first-first plug RF branch member 8111, a first-second plug RF branch member 8112, and a first plug RF insertion groove 8113.

The first-first plug RF branch member 8111 is connected to the first receptacle RF coupling member 411. The first-first plug RF branch member 8111 may be connected to the first receptacle RF coupling member 411 by being coupled to the first-first receptacle RF branch member 4111. The first-first plug RF branch member 8111 may be formed as a curved surface. As illustrated in FIGS. 19 and 20, the first-first plug RF branch member 8111 may be formed to constitute a curved surface in the second axial direction (Y-axis direction). Accordingly, the first-first plug RF branch member 8111 may move at least one of the first plug RF contact 81 and the first receptacle RF contact 41 in the second axial direction (Y-axis direction). For example, in a case in which the first receptacle RF contact 41 based on FIG. 19 is misaligned toward the left in the second axial direction (Y-axis direction), the first receptacle RF coupling member 411 comes in contact with the first-first plug RF branch member 8111 and then moves rightward along the curved surface of the first-first plug RF branch member 8111. Therefore, the board connector 1 according to the present disclosure may improve the ease in connecting the first receptacle RF contact 41 and the first plug RF contact 81 to each other.

The first-second plug RF branch member 8112 is connected to the first receptacle RF coupling member 411 at a position spaced apart from the first-first plug RF branch member 8111. The first-second plug RF branch member 8112 may be connected to the first receptacle RF coupling member 411 by being coupled to the first-second receptacle RF branch member 4112. The first-second plug RF branch member 8112 and the first-second plug RF branch member 8112 may be disposed to be spaced apart from each other in the second axial direction (Y-axis direction). Accordingly, the board connector 1 according to the present disclosure may be implemented to have a so-called "double point-of-contact structure" in which the first receptacle RF contact 41 and the first plug RF contact 81 come in contact with each other at a plurality of different positions and thus may improve the connection reliability and contact stability relating to the first receptacle RF contact 41 and the first plug RF contact 81.

The first-second plug RF branch member 8112 may be formed as a curved surface. As illustrated in FIGS. 19 and 20, the first-second plug RF branch member 8112 may be formed to constitute a curved surface in the second axial direction (Y-axis direction). Accordingly, the first-second plug RF branch member 8112 may move at least one of the first plug RF contact 81 and the first receptacle RF contact 41 in the second axial direction (Y-axis direction). For example, in a case in which the first receptacle RF contact 41 based on FIG. 19 is misaligned toward the right in the second axial direction (Y-axis direction), the first receptacle RF coupling member 411 comes in contact with the first-second plug RF branch member 8112 and then moves leftward along the curved surface of the first-second plug RF branch member 8112. Therefore, the board connector 1 according to the present disclosure may improve the ease in connecting the first receptacle RF contact 41 and the first plug RF contact 81 to each other.

The first plug RF insertion groove 8113 is formed between the first-second plug RF branch member 8112 and the first-first plug RF branch member 8111. In this case, connection between the first receptacle RF contact 41 and the first plug RF contact 81 may be performed by the first receptacle RF contact 41 being inserted into the first plug RF insertion groove 8113. In this case, the first receptacle RF contact 41 may serve as a receptacle contact, and the first plug RF contact 81 may serve as a plug contact. The first-second plug RF branch member 8112 and the first-first plug RF branch member 8111 may be formed as curved surfaces to induce insertion of the first receptacle RF coupling member 411 into the first plug RF insertion groove 8113. Although not illustrated, in a case in which the first plug RF insertion groove 8113 is formed in the first receptacle RF contact 41, the first receptacle RF contact 41 may serve as a plug contact, and the first plug RF contact 81 may serve as a receptacle contact. Each of the first-second plug RF branch member 8112 and the first-first plug RF branch member 8111 may be formed to have a curved surface that is bent toward the first plug RF insertion groove 8113.

Referring to FIGS. 19 and 20, the first plug RF contact 81 may include a first plug RF mounting member 812.

The first plug RF mounting member 812 is for mounting on the second board 10B. The first plug RF contact 81 is electrically connected to the second board 10B by the first plug RF mounting member 812 being mounted on the second board 10B. The first plug RF mounting member 812 may be formed of a material having conductivity.

The first plug RF mounting member 812 is mounted on the second board 10B and connected to the first plug RF coupling member 811. In this case, the first plug RF mounting member 812 may be connected to each of the first-first plug RF branch member 8111 and the first-second plug RF branch member 8112 so that the first-first plug RF branch member 8111 and the first-second plug RF branch member 8112 elastically move. The first plug RF insertion groove 8113 may be disposed at an inner side of the first plug RF mounting member 812, the first-first plug RF branch member 8111, and the first-second plug RF branch member 8112. Therefore, due to being pushed by the first receptacle RF coupling member 411 in a process in which the first receptacle RF coupling member 411 is inserted into the first plug RF insertion groove 8113, the first-second plug RF branch member 8112 and the first-first plug RF branch member 8111 move in an outward direction moving away from the first plug RF mounting member 812. Once the first receptacle RF coupling member 411 is inserted into the first plug RF insertion groove 8113, the first-second plug RF branch member 8112 and the first-first plug RF branch member 8111 move in an inward direction approaching the first plug RF mounting member 812 due to a restoration force. Accordingly, once the first receptacle RF coupling member 411 is inserted into the first plug RF insertion groove 8113, the first plug RF coupling member 811 may elastically press the first receptacle RF coupling member 411 to firmly maintain a state in which the first receptacle RF contact 41 and the first plug RF contact 81 are connected to each other. That is, since the first-second plug RF branch member 8112 elastically presses the first-second receptacle RF branch member 4112 and the first-first plug RF branch member 8111 elastically presses the first-first receptacle RF branch member 4111, the state in which the first receptacle RF contact 41 and the first plug RF contact 81 are connected to each other may be firmly maintained. The first plug RF mounting member 812, the first-first plug RF branch member 8111, and the first-second plug RF branch member 8112 may also be integrally formed.

The second plug RF contact 82 may be coupled to the plug insulating part 6 at a position spaced apart from the first plug RF contact 81. The second plug RF contact 82 may be formed of a material having conductivity. The second plug RF contact 82 may be implemented to be substantially the same as the first plug RF contact 81 except for the position at which the second plug RF contact 82 is disposed.

The second plug RF contact 82 is disposed at a position corresponding to the second receptacle RF contact 42 so as to be connected to the second receptacle RF contact 42. For the second plug RF contact 82 and the second receptacle RF contact 42 to be connected to each other, the second receptacle RF contact 42 and the second plug RF contact 82 may each include the following configuration.

The second receptacle RF contact 42 may include a second receptacle RF coupling member.

The second receptacle RF coupling member is connected to the second plug RF contact 82 for electrical connection between the first board 10A and the second board 10B. The second receptacle RF contact 42 may be coupled to the receptacle insulating part 2 so that the second receptacle RF coupling member is coupled to the second RF protrusion 222. The second receptacle RF coupling member may be formed of a material having conductivity. The second receptacle RF coupling member may be formed in an inverted U-shape as a whole. The second receptacle RF coupling member may be implemented to be substantially the same as the first receptacle RF coupling member 411.

The second receptacle RF coupling member may include a second-first receptacle RF branch member, a second-second receptacle RF branch member, and a second receptacle RF connection member. Since the second-first receptacle RF branch member, the second-second receptacle RF branch member, and the second receptacle RF connection member are implemented to be substantially the same as the first-first receptacle RF branch member 4111, the first-second receptacle RF branch member 4112, and the first receptacle RF connection member 4113, respectively, detailed descriptions thereof will be omitted.

The second receptacle RF contact 42 may include the second receptacle RF mounting member.

The second receptacle RF mounting member is for mounting on the first board 10A. Since the second receptacle RF mounting member is implemented to be substantially the same as the first receptacle RF mounting member 412, detailed description thereof will be omitted.

The second plug RF contact 82 may include a second plug RF coupling member.

The second plug RF coupling member is connected to the second receptacle RF coupling member for electrical connection between the first board 10A and the second board 10B. The second plug RF contact 82 may be coupled to the plug insulating part 6 so that the second plug RF coupling member is accommodated in the second RF accommodation groove 622. The second plug RF coupling member may be formed of a material having conductivity. The second plug RF coupling member may be formed in an inverted U-shape as a whole. The second plug RF coupling member may be implemented to be substantially the same as the first plug RF coupling member 811.

The second plug RF coupling member may include a second-first plug RF branch member, a second-second plug RF branch member, and a second plug insertion groove. Since the second-first plug RF branch member, the second-second plug RF branch member, and the second plug insertion groove are implemented to be substantially the same as the first-first plug RF branch member 8111, the first-second plug RF branch member 8112, and the first plug insertion groove 8113, respectively, detailed descriptions thereof will be omitted.

The second plug RF contact 82 may include a second plug RF mounting member.

The second plug RF mounting member is for mounting on the second board 10B. Since the second plug RF mounting member is implemented to be substantially the same as the first plug RF mounting member 812, detailed description thereof will be omitted.

Referring to FIGS. 5 and 14 to 16, the plug grounding part 9 is for grounding to the receptacle grounding part 5. The plug grounding part 9 may be coupled to the plug insulating part 6 so as to be spaced apart from the plug RF contact 8.

The plug grounding part 9 may be formed to surround a side of the plug RF contact 8. Accordingly, through the plug grounding part 9, the board connector 1 according to the present disclosure may implement a physical barrier that blocks a RF electromagnetic wave radiated from the plug RF contact 8 from flowing to the outside. Therefore, the board connector 1 according to the present disclosure may contribute to an improvement in performance of an adjacent electronic device. The accommodation grooves 61 and 62 may be disposed at an inner side of the plug grounding part 9. The plug grounding part 9 may extend in the second direction (the direction indicated by the arrow SD) from the lower surface of the plug insulating member 60. The plug grounding part 9 may be formed of a metal material.

The plug grounding part 9 may be coupled to the receptacle grounding part 5 due to being inserted into the seating groove 23. When the plug grounding part 9 is inserted into the seating groove 23, the plug RF contact 8 and the receptacle RF contact 4 may be accommodated inside the receptacle grounding part 5 and the plug grounding part 9. Accordingly, in the board connector 1 according to the present disclosure, both the receptacle grounding part 5 and the plug grounding part 9 may improve the shielding force blocking the RF electromagnetic wave radiated from each of the RF contact portions 4 and 8. Accordingly, the board connector 1 according to the present disclosure may further contribute to an improvement in performance of an adjacent electronic device.

Referring to FIGS. 14 to 16, the plug grounding part 9 may include a first plug grounding member 91.

The first plug grounding member 91 may be disposed to cover at least two sides of the first plug RF contact 81 at a position spaced apart from the first plug RF contact 81. Accordingly, through the first plug grounding member 91, the board connector 1 according to the present disclosure may implement a shielding force that blocks a RF electromagnetic wave radiated from the first plug RF contact 81 from flowing to the outside.

The first plug grounding member 91 may also be formed to cover all sides of the first plug RF contact 81 at a position spaced apart from the first plug RF contact 81. In this case, the first plug RF contact 81 may be disposed at an inner side of the first plug grounding member 91. Accordingly, the board connector 1 according to the present disclosure may strengthen the shielding force using the first plug grounding member 91. The first plug grounding member 91 may be formed to cover four sides of the first plug RF contact 81 at a position spaced apart from the first plug RF contact 81.

Figure 21:
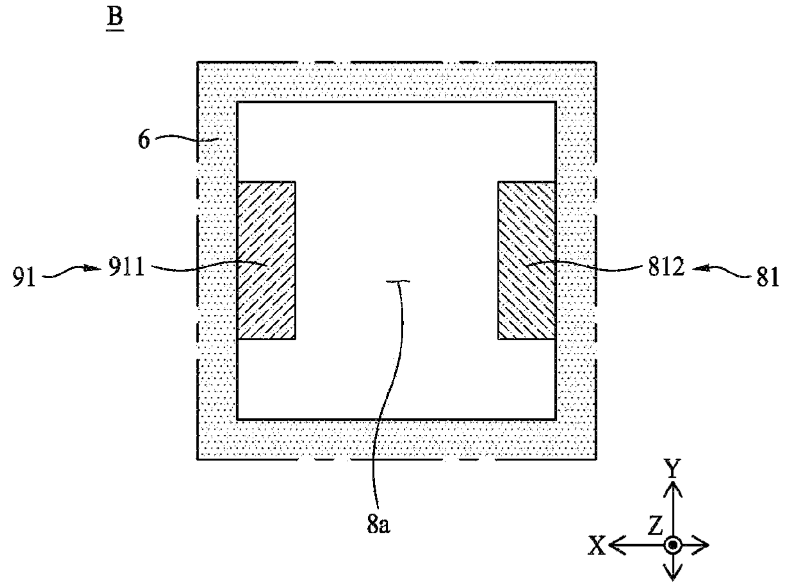
FIG. 21 is a schematic enlarged view of portion B of FIG. 15.

Referring to FIGS. 15, 16, and 21, a plug cutting hole 8*a* may be formed between the first plug grounding member 91 and the first plug RF contact 81. The first plug grounding member 91 and the first plug RF contact 81 may be spaced apart from each other with respect to the plug cutting hole 8*a*. In a case in which the first plug grounding member 91 and the first plug RF contact 81 are integrally formed using a single plate material, the plug cutting hole 8*a* may be formed by performing press machining one time. Accordingly, the board connector 1 according to the present disclosure may improve the ease of manufacture of each of the first plug grounding member 91 and the first plug RF contact 81 and, through the plug cutting hole 8*a*, reduce the possibility that the first plug grounding member 91 and the first plug RF contact 81 are grounded to each other. Therefore, the board connector 1 according to the present disclosure may improve the performance of each of the first plug grounding member 91 and the first plug RF contact 81.

As many plug cutting holes 8*a* as the number of RF contacts belonging to the plug RF contact 8 may be formed. In the case in which the plug RF contact 8 includes the two RF contacts 81 and 82, the board connector 1 according to the present disclosure may include two plug cutting holes 8*a*. FIG. 15 illustrates two plug cutting holes 8*a*, but this is only illustrative, and the board connector 1 according to the present disclosure may also include a single plug cutting hole 8*a* or three or more plug cutting holes 8*a* as long as the plug RF contact 8 and the plug grounding part 9 may be spaced apart from each other.

The plug cutting hole 8*a* may communicate with a plug communication hole (not illustrated) formed in the plug insulating part 6. The plug communication hole may be formed in a larger size than the plug cutting hole 8*a*. The plug communication hole may be formed in a rectangular parallelepiped shape as a whole. The plug communication hole may be disposed in the second direction (the direction indicated by the arrow SD) from the plug cutting hole 8*a*. The plug communication hole and the plug cutting hole 8*a* may also be formed together by performing press machining one time.

Referring to FIGS. 15, 16, and 21, the first plug grounding member 91 may include a first plug grounding mounting member 911.

The first plug grounding mounting member 911 is mounted on the second board 10B. The first plug grounding member 91 may be mounted on the second board 10B through the first plug grounding mounting member 911. The first plug grounding mounting member 911 may protrude toward the first plug RF mounting member 812. In this case, the first plug RF mounting member 812 may protrude toward the first plug grounding mounting member 911. For example, the first plug grounding mounting member 911 may protrude a second grounding protruding distance, and the first plug RF mounting member 812 may protrude a second RF protruding distance.

A surface of the first plug grounding mounting member 911 that is mounted on the second board 10B (see FIG. 6) and a surface of the first plug RF mounting member 812 that is mounted on the second board 10B (see FIG. 6) may be disposed on the same horizontal plane. In this case, the surface of the first plug grounding mounting member 911 that is mounted on the second board 10B (see FIG. 6) may correspond to an upper surface of the first plug grounding mounting member 911. The surface of the first plug RF mounting member 812 that is mounted on the second board 10B (see FIG. 6) may correspond to an upper surface of the first plug RF mounting member 812.

The first plug grounding member 91 may also include a plurality of first plug grounding mounting members 911. The first plug grounding mounting members 911 may be disposed to be spaced apart from the first plug RF mounting member 812 in different directions. In this case, the first plug RF mounting member 812 may be disposed at an inner side of the first plug grounding mounting members 911. Accordingly, the board connector 1 according to the present disclosure may implement a shielding force for the first plug RF mounting member 812 using the first plug grounding mounting members 911. For example, as illustrated in FIG. 16, the first plug grounding member 91 may include four first plug grounding mounting members 911*a*, 911*b*, 911*c*, and 911*d*. In this case, the first plug grounding mounting members 911*a*, 911*b*, 911*c*, and 911*d* may be disposed to surround four surfaces of the first plug RF mounting member 812. The first plug grounding mounting members 911*a*, 911*b*, 911*c*, and 911*d* may be disposed to be spaced apart from each other.

As illustrated in FIG. 21, the plug cutting hole 8*a* may be formed to have a size that is larger than each of the second grounding protruding distance and the second RF protruding distance. Accordingly, by increasing a separation distance between the first plug grounding member 91 and the first plug RF contact 81 through the plug cutting hole 8*a*, the board connector 1 according to the present disclosure may further reduce the possibility that the first plug grounding member 91 and the first plug RF contact 81 are grounded to each other. In FIG. 21, the hatching is for distinguishing configurations instead of indicating cross-sections.

Meanwhile, through the plug cutting hole 8*a*, each of the first plug grounding mounting member 911 and the first plug RF mounting member 812 may be exposed to the outside. In this case, a portion of the first plug grounding mounting member 911 and a portion of the first plug RF mounting member 812 may be exposed to the outside through the plug cutting hole 8*a*.

The first plug grounding member 91 may include a first plug grounding inner member 912.

The first plug grounding inner member 912 may be disposed to be inserted into the first RF accommodation groove 621. Accordingly, a distance at which the first plug grounding inner member 912 is spaced apart from the RF contact portions 4 and 8 accommodated in the first RF accommodation groove 621 may be decreased. Therefore, using the first plug grounding inner member 912, the first plug grounding member 91 may further improve the shielding force for the RF contact portions 4 and 8 accommodated in the first RF accommodation groove 621. The first plug grounding inner member 912 may be inserted into the first RF accommodation groove 621 so as to be disposed in a direction toward the transmission accommodation groove 61 in the first RF accommodation groove 621.

The first plug grounding member 91 may also include a plurality of first plug grounding inner members 912. In this case, the first plug grounding inner members 912 may be disposed to be spaced apart from each other in the first axial direction (X-axis direction). In the first axial direction (X-axis direction), the RF contact portions 4 and 8 may be disposed between the first plug grounding inner members 912.

The first plug grounding member 91 may include a first plug grounding connection member 913 and a first plug grounding outer member 914.

The first plug grounding connection member 913 may be coupled to each of the first plug grounding inner member 912 and the first plug grounding outer member 914. The first plug grounding connection member 913 may be disposed between the first RF accommodation groove 621 and an outer portion of the first RF accommodation groove 621. The first plug grounding connection member 913, the first plug grounding outer member 914, and the first plug grounding inner member 912 may also be integrally formed. Based on FIG. 14, the first plug grounding connection member 913 may be supported by an upper surface of the plug insulating member 60. The first plug grounding member 91 may also include a plurality of first plug grounding connection members 913. In a case in which the plug insulating member 60 includes a plurality of sidewalls that surround the first RF accommodation groove 621, the first plug grounding member 91 may be supported by upper surfaces of the sidewalls of the plug insulating member 60.

The first plug grounding outer member 914 may be disposed outside the first RF accommodation groove 621. The first plug grounding outer member 914 may implement a shielding force for the RF contact portions 4 and 8 accommodated in the first RF accommodation groove 621 outside the first RF accommodation groove 621. Therefore, using the first plug grounding outer member 914, the first plug grounding member 91 may further improve the shielding force for the RF contact portions 4 and 8 accommodated in the first RF accommodation groove 621.

The first plug grounding member 91 may also include a plurality of first plug grounding outer members 914. In a case in which the plug insulating member 60 includes a plurality of sidewalls that surround the first RF accommodation groove 621, the first plug grounding member 91 may be disposed to cover outer side surfaces of the sidewalls of the plug insulating member 60. In this case, the first plug grounding inner member 912 may be disposed to cover inner side surfaces of the sidewalls of the plug insulating member 60.

Referring to FIGS. 14 to 16, the plug grounding part 9 may include a second plug grounding member 92.

The second plug grounding member 92 may be disposed at a position spaced apart from the first plug grounding member 91. The second plug grounding member 92 may be disposed to cover at least two sides of the second plug RF contact 82 at a position spaced apart from the second plug RF contact 82. Accordingly, through the second plug grounding member 92, the board connector 1 according to the present disclosure may implement a shielding force that blocks a RF electromagnetic wave radiated from the second plug RF contact 82 from flowing to the outside.

The second plug grounding member 92 may also be formed to cover all sides of the second plug RF contact 82 at a position spaced apart from the second plug RF contact 82. In this case, the second plug RF contact 82 may be disposed at an inner side of the second plug grounding member 92. Accordingly, the board connector 1 according to the present disclosure may strengthen the shielding force using the second plug grounding member 92. The second plug grounding member 92 may be formed to cover four sides of the second plug RF contact 82 at a position spaced apart from the second plug RF contact 82. The second plug grounding member 92 and the first plug grounding member 91 may also be integrally formed with each other.

The plug cutting hole 8*a* may be formed between the second plug grounding member 92 and the second plug RF contact 82. In a case in which the second plug grounding member 92 and the second plug RF contact 82 are integrally formed using a single plate material, the plug cutting hole 8*a* may be formed by performing press machining one time.

The second plug grounding member 92 may include a second plug grounding mounting member.

The second plug grounding mounting member is mounted on the second board 10B. The second plug grounding member 92 may be mounted on the second board 10B through the second plug grounding mounting member. The second plug grounding mounting member may protrude toward the second plug RF mounting member of the second plug RF contact 82. In this case, the second plug RF mounting member may protrude toward the second plug grounding mounting member.

A surface of the second plug grounding mounting member that is mounted on the second board 10B (see FIG. 6) and a surface of the second plug RF mounting member that is mounted on the second board 10B (see FIG. 6) may be disposed on the same horizontal plane. In this case, the surface of the second plug grounding mounting member that is mounted on the second board 10B (see FIG. 6) may correspond to an upper surface of the second plug grounding mounting member. The surface of the second plug RF mounting member that is mounted on the second board 10B (see FIG. 6) may correspond to an upper surface of the second plug RF mounting member.

The second plug grounding member 92 may also include a plurality of second plug grounding mounting members. The second plug grounding mounting members may be disposed to be spaced apart from the second plug RF mounting member in different directions. In this case, the second plug RF mounting member may be disposed at an inner side of the second plug grounding mounting members. Accordingly, the board connector 1 according to the present disclosure may implement a shielding force for the second plug RF mounting member using the second plug grounding mounting members. For example, the second plug grounding member 92 may include four second plug grounding mounting members. In this case, the second plug grounding mounting members may be disposed to surround four surfaces of the second plug RF mounting member. The second plug grounding mounting members may be disposed to be spaced apart from each other.

The plug cutting hole 8*a* may be formed to have a size that is larger than each of the second plug grounding mounting member and the second plug RF mounting member. Accordingly, the board connector 1 according to the present disclosure may be implemented to increase a separation distance between the second plug grounding member 92 and the second plug RF contact 82 through the plug cutting hole 8*a*.

The second plug grounding member 92 may include a second plug grounding inner member 921.

The second plug grounding inner member 921 may be disposed to be inserted into the second RF accommodation groove 622. Accordingly, a distance at which the second plug grounding inner member 921 is spaced apart from the RF contact portions 4 and 8 accommodated in the second RF accommodation groove 622 may be decreased. Therefore, using the second plug grounding inner member 921, the second plug grounding member 92 may further improve the shielding force for the RF contact portions 4 and 8 accommodated in the second RF accommodation groove 622. The second plug grounding inner member 921 may be inserted into the second RF accommodation groove 622 so as to be disposed in a direction toward the transmission accommodation groove 61 in the second RF accommodation groove 622.

The second plug grounding member 92 may also include a plurality of second plug grounding inner members 921. In this case, the second plug grounding inner members 921 may be disposed to be spaced apart from each other in the first axial direction (X-axis direction). In the first axial direction (X-axis direction), the RF contact portions 4 and 8 may be disposed between the second plug grounding inner members 921.

The second plug grounding member 92 may include a second plug grounding connection member 922 and a second plug grounding outer member 923.

The second plug grounding connection member 922 may be coupled to each of the second plug grounding inner member 921 and the second plug grounding outer member 923. The second plug grounding connection member 922 may be disposed between the second RF accommodation groove 622 and an outer portion of the second RF accommodation groove 622. The second plug grounding connection member 922, the second plug grounding outer member 923, and the second plug grounding inner member 921 may also be integrally formed. Based on FIG. 14, the second plug grounding connection member 922 may be supported by an upper surface of the plug insulating member 60. The second plug grounding member 92 may also include a plurality of second plug grounding connection members 922. In a case in which the plug insulating member 60 includes a plurality of sidewalls that surround the second RF accommodation groove 622, the second plug grounding member 92 may be supported by upper surfaces of the sidewalls of the plug insulating member 60.

The second plug grounding outer member 923 may be disposed outside the second RF accommodation groove 622. The second plug grounding outer member 923 may implement a shielding force for the RF contact portions 4 and 8 accommodated in the first RF accommodation groove 621 outside the second RF accommodation groove 622. Therefore, using the second plug grounding outer member 923, the second plug grounding member 92 may further improve the shielding force for the RF contact portions 4 and 8 accommodated in the second RF accommodation groove 622.

The second plug grounding member 92 may also include a plurality of second plug grounding outer members 923. In a case in which the plug insulating member 60 includes a plurality of sidewalls that surround the second RF accommodation groove 622, the second plug grounding member 92 may be disposed to cover outer side surfaces of the sidewalls of the plug insulating member 60. In this case, the second plug grounding inner member 921 may be disposed to cover inner side surfaces of the sidewalls of the plug insulating member 60.

Figure 22:
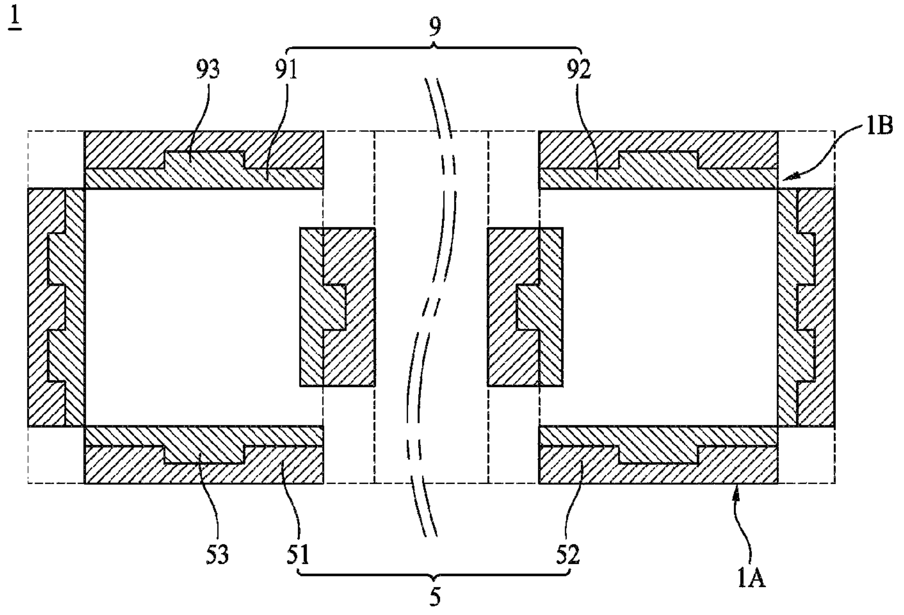
FIG. 22 is a schematic plan cross-sectional view illustrating a state in which a support protrusion is inserted into a support groove when the plug connector and the receptacle connector are coupled to each other in the board connector according to the present disclosure.

Referring to FIGS. 4, 5, and 22, the board connector 1 according to the present disclosure may include the following configuration to strengthen a pull-out force between the receptacle connector 1A and the plug connector 1B.

The receptacle connector 1A may include a support groove 53. The support groove 53 may be formed in the receptacle grounding part 5. In a case in which the receptacle grounding part 5 includes the first receptacle grounding member 51 and the second receptacle grounding member 52, the support groove 53 may be formed in at least one of the first receptacle grounding member 51 and the second receptacle grounding member 52.

In a case in which the support groove 53 is formed in the first receptacle grounding member 51, the support groove 53 may be formed in a first inner side surface of the first receptacle grounding member 51 that faces the first receptacle RF contact 41. In a case in which the first receptacle grounding member 51 includes a plurality of first inner side surfaces, the support groove 53 may be formed in each of the first inner side surfaces. A plurality of support grooves 53 may be formed in some of the first inner side surfaces. A plurality of support grooves 53 may also be formed in all of the first inner side surfaces.

In a case in which the support groove 53 is formed in the second receptacle grounding member 52, the support groove 53 may be formed in a second inner side surface of the second receptacle grounding member 52 that faces the second receptacle RF contact 42. In a case in which the second receptacle grounding member 52 includes a plurality of second inner side surfaces, the support groove 53 may be formed in each of the second inner side surfaces. A plurality of support grooves 53 may be formed in some of the second inner side surfaces. A plurality of support grooves 53 may also be formed in all of the second inner side surfaces.

The plug connector 1B may include a support protrusion 93. When the plug connector 1B and the receptacle connector 1A are coupled to each other, the support protrusion 93 may be inserted into the support groove 53. Accordingly, the connector 1 according to the present disclosure may strengthen a pull-out force between the receptacle connector 1A and the plug connector 1B using the support protrusion 93 and the support groove 53 and thus prevent the receptacle connector 1A and the plug connector 1B from being easily separated from each other.

The support protrusion 93 may be formed on the plug grounding part 9. In this case, when the support protrusion 93 is inserted into the support groove 53 as the plug connector 1B and the receptacle connector 1A are coupled to each other, the receptacle grounding part 5 may support the support protrusion 93 inserted into the support groove 53, thereby supporting the plug grounding part 9. Therefore, since a pull-out force between the receptacle grounding part 5 and the plug grounding part 9 is strengthened, a pull-out force between the plug connector 1B and the receptacle connector 1A may be strengthened. In a case in which the plug grounding part 9 includes the first plug grounding member 91 and the second plug grounding member 92, the support protrusion 93 may be formed on at least one of the first plug grounding member 91 and the second plug grounding member 92.

In a case in which the support protrusion 93 is formed on the first plug grounding member 91, the support protrusion 93 may be formed on a first outer side surface of the first plug grounding member 91. The first outer side surface may be a surface of the first plug grounding outer member 914 (see FIG. 14). In a case in which the first plug grounding member 91 includes a plurality of first outer side surfaces, the support protrusion 93 may be formed on each of the first outer side surfaces. A plurality of support protrusions 93 may be formed on some of the first outer side surfaces. A plurality of support protrusions 93 may also be formed on all of the first outer side surfaces.

In a case in which the support protrusion 93 is formed on the second plug grounding member 92, the support protrusion 93 may be formed on a second outer side surface of the second plug grounding member 92. The second outer side surface may be a surface of the second plug grounding outer member 923 (see FIG. 14). In a case in which the second plug grounding member 92 includes a plurality of second outer side surfaces, the support protrusion 93 may be formed on each of the second outer side surfaces. A plurality of support protrusions 93 may be formed on some of the second outer side surfaces. A plurality of support protrusions 93 may also be formed on all of the second outer side surfaces.

The present disclosure which has been described above is not limited to the above embodiments and the accompanying drawings, and it should be apparent to those of ordinary skill in the art to which the present disclosure pertains that various substitutions, modifications, and changes are possible within a scope not departing from the technical spirit of the present disclosure.

The invention claimed is:

1. A board connector comprising:

a receptacle insulating part;

a receptacle transmission contact coupled to the receptacle insulating part and configured to allow electrical connection to a plug connector;

a receptacle radio frequency (RF) contact coupled to the receptacle insulating part so as to be disposed at a position spaced apart from the receptacle transmission contact and configured to allow transmission of a RF signal; and a receptacle grounding part coupled to the receptacle insulating part so as to be spaced apart from the receptacle RF contact and surround the receptacle RF contact in a horizontal direction, wherein the receptacle insulating part includes a transmission protrusion configured to support the receptacle transmission contact, the receptacle RF contact includes a first receptacle RF contact and a second receptacle RF contact coupled to the receptacle insulating part so as to be disposed to be spaced apart from each other while the transmission protrusion and the receptacle transmission contact are disposed therebetween, the receptacle grounding part includes a first receptacle grounding member coupled to a first sidewall of the receptacle insulating part at a position spaced apart from the first receptacle RF contact, and the first receptacle grounding member includes:

a first receptacle grounding inner member disposed to cover a first sidewall inner surface of the first sidewall between the first receptacle RF contact and the first sidewall;

a first receptacle grounding outer member disposed to cover a first sidewall outer surface which is in a direction opposite to the first sidewall inner surface; and a first receptacle grounding connection member configured to connect an upper end of the first receptacle grounding inner member and an upper end of the first receptacle grounding outer member; and a first receptacle grounding mounting member protrudes from a lower end of the first receptacle grounding inner member toward the first receptacle RF contact, and wherein the first receptacle grounding connection member is disposed higher than an upper end of the first receptacle RF contact, and the first receptacle grounding mounting member is mounted on a first board, wherein the first receptacle RF contact is not exposed to the outside along a first axial direction that the first receptacle RF contact and the second receptacle RF contact are disposed and a second axial direction perpendicular to the first axial direction, wherein the first receptacle RF contact is double-shielded through the first receptacle grounding inner member and the first receptacle grounding outer member.

2. The board connector of claim 1, wherein:

the first receptacle grounding member includes a first receptacle grounding corner member disposed to cover a first sidewall corner of the first sidewall outer surface; and the first receptacle grounding corner member and the first receptacle grounding outer member are connected to each other.

3. The board connector of claim 1, wherein a receptacle cutting hole is formed between the first receptacle grounding member and the first receptacle RF contact.

4. The board connector of claim 3, wherein:

the first receptacle RF contact includes a first receptacle RF mounting member for mounting on the first board; and a portion of the first receptacle grounding mounting member and a portion of the first receptacle RF mounting member are exposed to the outside through the receptacle cutting hole.

5. The board connector of claim 1, wherein:

the receptacle insulating part includes a RF protrusion configured to support the receptacle RF contact;

the transmission protrusion protrudes a first protruding distance from a lower surface of the receptacle insulating part; and the RF protrusion protrudes a second protruding distance, which is shorter than the first protruding distance, from the lower surface of the receptacle insulating part.

6. The board connector of claim 1, wherein:

the first receptacle RF contact includes a first receptacle RF mounting member for mounting on the first board; and a surface of the first receptacle grounding mounting member that is mounted on the first board and a surface of the first receptacle RF mounting member that is mounted on the first board are disposed on a shared horizontal plane.

7. A board connector comprising:

a plug insulating part;

a plug transmission contact coupled to the plug insulating part and configured to allow electrical connection to a receptacle connector;

a plug radio frequency (RF) contact coupled to the plug insulating part so as to be disposed at a position spaced apart from the plug transmission contact and configured to allow transmission of a RF signal; and a plug grounding part coupled to the plug insulating part so as to be spaced apart from the plug RF contact and surrounding the receptacle RF contact in a horizontal direction, wherein the plug RF contact includes a first plug RF contact and a second plug RF contact coupled to the plug insulating part so as to be disposed to be spaced apart from each other while a transmission accommodation groove, which is formed in the plug insulating part, and the plug transmission contact are disposed therebetween, and the plug grounding part includes a first plug grounding member formed to cover at least two sides of the first plug RF contact at a position spaced apart from the plug RF contact, and wherein the first plug grounding member includes:

a first plug grounding mounting member that configures a lower end;

a first plug grounding connection member that is continuous from the first plug grounding mounting member and configures an upper end, and wherein the first plug grounding mounting member is mounted on a second board, and the first plug grounding connection member is disposed higher than the first plug RF contact, and wherein the first plug RF contact is not exposed to the outside along a first axial direction that the first plug RF contact and the second plug RF contact are disposed and a second axial direction perpendicular to the first axial direction.

8. The board connector of claim 7, wherein a plug cutting hole is formed between the first plug grounding member and the first plug RF contact.

9. The board connector of claim 8, wherein:

the first plug RF contact includes a first plug RF mounting member for mounting on the second board; and a portion of the first plug grounding mounting member and a portion of the first plug RF mounting member are exposed to the outside through the plug cutting hole.

10. The board connector of claim 7, wherein:

the plug insulating part includes a first RF accommodation groove configured to accommodate the first plug RF contact; and the first plug grounding member includes a first plug grounding inner member disposed to be inserted into the first RF accommodation groove.

11. The board connector of claim 10, wherein the first plug grounding member includes a first plug grounding outer member disposed outside the first RF accommodation groove, and wherein a first plug grounding connection member coupled to each of an upper end of the first plug grounding outer member and an upper end of the first plug grounding inner member.

12. The board connector of claim 7, wherein:

the first plug RF contact includes a first plug RF mounting member for mounting on the second board; and a surface of the first plug grounding mounting member that is mounted on the second board and a surface of the first plug RF mounting member that is mounted on the second board are disposed on a shared horizontal plane.

* * * * *